(12) United States Patent
Agner et al.

(10) Patent No.: US 7,874,415 B2
(45) Date of Patent: Jan. 25, 2011

(54) TORQUE TRANSFER DEVICE

(75) Inventors: Ivo Agner, Buehl (DE); Gabor Izso, Buehl (DE); Oliver Noehl, Buehlertal (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 505 days.

(21) Appl. No.: 12/001,808

(22) Filed: Dec. 13, 2007

(65) Prior Publication Data

US 2008/0142330 A1 Jun. 19, 2008

(30) Foreign Application Priority Data

Dec. 18, 2006 (DE) .................. 10 2006 059 669

(51) Int. Cl.
*F16D 21/06* (2006.01)
*F16D 13/74* (2006.01)
(52) U.S. Cl. .................. 192/48.8; 192/70.12; 192/70.3; 192/113.34
(58) Field of Classification Search ............ 192/48.603, 192/48.619, 85.51, 85.52, 85.61
See application file for complete search history.

(56) References Cited

U.S. PATENT DOCUMENTS

2005/0279604 A1* 12/2005 Vetter et al. ............... 192/48.8

2006/0000684 A1    1/2006  Agner et al.
2006/0081435 A1*   4/2006  Heinrich et al. .......... 192/70.11
2007/0227852 A1*  10/2007  Uhler ........................ 192/48.8

FOREIGN PATENT DOCUMENTS

| EP | 1482195 | 12/2004 |
| EP | 1610017 | 12/2005 |
| WO | 2007/112722 A1 | 10/2007 |

\* cited by examiner

*Primary Examiner*—Richard M. Lorence
(74) *Attorney, Agent, or Firm*—Simpson & Simpson, PLLC

(57) ABSTRACT

A torque transfer device, in particular in the drive train of a motor vehicle for torque transfer between a drive unit, in particular a combustion engine, and a transmission with at least one multi-disk clutch, in particular, a twin multi-disk clutch, comprising at least one disk packet, comprising outer disks, connected torque proof with an outer disk carrier, and inner disks, connected torque proof with an inner disk carrier (17, 27), and with at least one operating lever device for operating the multi-disk clutch, wherein a pressure transfer device extends between the disk packet and the operating lever device through at least one pass-through opening, which is cut out in a carrier device. The seal device is disposed between the inner disk carrier and the pass-through opening.

59 Claims, 21 Drawing Sheets

TORQUE TRANSFER DEVICE

CROSS REFERENCE TO RELATED APPLICATIONS

This patent claims priority of German Patent Application No. 10 2006 059 669.2, filed Dec. 18, 2006, which application is incorporated herein by reference.

BACKGROUND OF THE INVENTION

The invention relates to a torque transfer device, in particular in the drive train of a motor vehicle, for torque transfer between a drive unit, in particular a piston engine, and a transmission, with at least one multi-disk clutch, in particular a double disk clutch, comprising at least one disk packet, comprising outer disks, which are connected non-rotatably with an outer disk carrier, and inner disks, which are connected non-rotatably with an inner disk carrier, and with at least one operating lever device for operating the multi disk clutch, wherein a pressure transfer device extends between the disk packet and the operating lever device through at least one pass-through hole, which is cut out in a carrier device.

SUMMARY OF THE INVENTION

The invention broadly comprises a torque transfer device, in particular in the drive train of a motor vehicle, for torque transfer between a drive unit, in particular a combustion engine and a transmission, with at least one multi-disk clutch (3, 4), in particular, a twin multi-disk clutch, comprising at least one disk packet (11, 21), comprising outer disks, connected torque proof with outer disk carrier (14, 24), and inner disks, connected non-rotatably with inner disk carrier (17, 27), and with at least one operating lever device (34, 64) for operating the multi-disk clutch, wherein pressure transfer device (36) extends between disk packet (11) and operating lever device (34) through at least one pass-through opening (38), which is cut out in carrier device (30), wherein seal device (50, 140) is disposed between inner disk carrier (17) and pass-through opening (38). The invention also comprises a torque transfer device, in particular in the drive train of a motor vehicle, for torque transfer between a drive unit, in particular a combustion engine and a transmission, with radially inner multi-disk clutch (4) and radially outer multi-disk clutch (3), each comprising respective disk packet (21, 11), which comprises outer disks, connected non-rotatably with outer disk carrier (14, 24), and inner disks, connected non-rotatably with inner disk carrier (27, 17), and with one respective operating lever device (64, 34) each for operating the multi-disk clutch, wherein outer disk carrier (24) of inner multi disk clutch (4) is assembled in two components from teething body (161), which is connected non-rotatably through a teething with the outer disks of the inner multi-disk clutch, and connection component (30), through which outer disk carrier (24) of inner multi-disk clutch (4) is connected non-rotatably with outer disk carrier (14) of outer multi disk clutch (3). The invention is simple in construction and can be manufactured in a cost efficient manner. In particular, the cooling of the disk packet shall be improved.

The object is accomplished in a torque transfer device in that a seal device is disposed between the inner disk carrier and the pass-through hole. Through the seal device, a leakage of the cooling medium through the pass-through hole, occurring during the operation of the torque transfer device, can be significantly reduced. The preferred purpose of the carrier device is to connect the outer disk carrier of the multi-disk clutch with an additional outer disk carrier of an additional multi-disk clutch, which is disposed radially inside of the first multi disk clutch, non-rotatably.

A preferred embodiment of the torque transfer device is characterized in that the seal device comprises a seal ring, overlapping the gap between the inner disk carrier and the disk packet in radial direction. Thereby, an undesired outflow of cooling media in the axial direction through the pass though holes in the carrier device is avoided.

Another preferred embodiment of the torque transfer device is characterized in that the seal ring comprises at least partially a substantially L-shaped, U-shaped, or C-shaped cross section. Preferably, the C-shaped, U-shaped, or L-shaped cross section is open towards the disk packet.

Another preferred embodiment of the torque transfer device is characterized in that the seal ring, viewed in cross section, has an arm, which is disposed in radial direction between the pressure ring and one, or the outer disk carrier of one or the second multi-disk clutch, which is disposed radially within the first multi-disk clutch. Thereby, the seal ring is positioned in the radial direction.

Another preferred embodiment of the torque transfer device is characterized in that the seal ring, seen in cross section, has an arm, which is disposed offset relative to the inner disk carrier, and disposed radially outside of inner the disk carrier. Thereby, the cooling medium is conducted between the outer disk carrier and the associated disk packet.

Another preferred embodiment of the torque transfer device is characterized in that the end of the arm is located between the inner disk carrier and an associated disk. The disk is preferably an end disk.

Another preferred embodiment of the torque transfer device is characterized in that the seal ring, seen in cross section, has another arm, which is disposed offset in the axial direction, and radially within the inner disk carrier. Thereby, a leakage of cooling medium in the axial direction is safely avoided.

Another preferred embodiment of the torque transfer device is characterized in that the seal device is provided as transport safety. According to another aspect of the invention, the seal device avoids that the disks of the disk packet disengage from the associated disk carrier.

Another preferred embodiment of the torque transfer device is characterized in that the seal device comprises an installation safety. According to another aspect of the invention, the seal device is provided, for example preloaded, so that an undesired disengagement of the seal device after its installation is avoided.

Another preferred embodiment of the torque transfer device is characterized in that the installation safety comprises an engagement device, which causes the engagement of the seal device upon its installation. Thereby, a fixation of the seal device in an installed state is facilitated in a simple manner.

Another preferred embodiment of the torque transfer device is characterized in that the installation safety is provided with a bayonet lock. According to another aspect of the invention, the seal device is initially inserted in the axial direction, and then rotated, in order to fixate the seal device and other components safely in installed position, or to position them.

Another preferred embodiment of the torque transfer device is characterized in that the seal device, in particular the seal ring, comprises at least one lug, one hook, and/or one arm, respectively, extending at least partially radially towards the inside, and engaging with an indentation, a pass-through hole, or a groove, which are preferably provided in one, or the outer disk carrier of one or the second multi-disk clutch, which is disposed radially within the first multi-disk clutch. Thereby, for example, a bayonet lock of the seal device is facilitated.

Another preferred embodiment of the torque transfer device is characterized in that the nose, the hook, or the arm is resiliently preloaded. Thereby, undesired clearance, which could generate rattling noises, can be avoided.

Another preferred embodiment of the torque transfer device is characterized in that the seal ring is resiliently preloaded. Through the preload, the seal ring can be centered.

Another preferred embodiment of the torque transfer device is characterized in that the seal ring is provided so that the opening motion of the multi-disk clutch is supported through the seal device. According to another aspect of the invention, the preload of the seal device or of parts of the seal device is used for this purpose.

Another preferred embodiment of the torque transfer device is characterized in that the seal device is provided so that the seal device performs its seal function only when the multi-disk clutch is closed. When the multi-disk is open, a gap between the seal device and another component can occur.

Another preferred embodiment of the torque transfer device is characterized in that the seal device is punched and/or formed from sheet metal. Thereby the manufacturing cost can be reduced.

Another preferred embodiment of the torque transfer device is characterized in that the seal device is made from plastic. The seal device is preferably provided as an injection molded part.

Another preferred embodiment of the torque transfer device is characterized in that the seal device has at least one snap hook, which engages into an opening of the carrier device. Thereby, a fixation of the seal device at the carrier device is facilitated in a simple manner. Preferably, several snap hooks are provided at the seal device.

Another preferred embodiment of the torque transfer device is characterized in that the pressure ring comprises centering means. Thereby, the centering of the pressure ring during installation is facilitated.

Another preferred embodiment of the torque transfer device is characterized in that the pressure ring comprises lugs with lateral surfaces, in particular radially on the inside, which serve the purpose of centering the pressure ring. The side surfaces preferably operate together with a teething.

Another preferred embodiment of the torque transfer device is characterized in that the pressure ring, in particular, radially on the outside, has teeth with flanks, which serve the purpose of centering the pressure ring. The teeth with flanks operate in connection with another teething.

Another preferred embodiment of the torque transfer device is characterized in that the pressure ring, preferably radially on the outside, has a bent over rim portion. The bent over rim portion, e.g., serves the purpose of increasing stiffness. Alternatively or additionally, the bent over rim portion can also serve the purpose of centering.

In a torque transfer device according to the invention, the object described above is accomplished through the outer disk carrier of the inner multi-disk clutch being provided in two components, from a teething body, which is connected non-rotatably with the outer disks of the inner multi-disk clutch, through a teething, and a connection component, through which the outer disk carrier of the inner multi-disk clutch is connected non-rotatably of with the outer disk carrier of the outer multi-disk clutch. This has the advantage that the teething body can be manufactured through roll forming.

An embodiment of the torque transfer device is characterized in that the teething body is formed from a sheet metal part through roll forming. Thereby the manufacture of the teething is simplified considerably.

Another preferred embodiment of the torque transfer device is characterized in that the outer disk carrier of the outer multi-disk clutch is connected with the connection component through a sliding connection. Through the sliding connection, assembly is facilitated.

Another preferred embodiment of the torque transfer device is characterized in that the outer disk carrier of the outer multi-disk clutch has cutouts, into which the bars engage, which are provided at the connection component. Thereby, a form locked connection between the teething body of the outer disk carrier and the connection component is provided in a simple manner.

Another preferred embodiment of the torque transfer device is characterized in that the width of the bars is selected so that a punching out of the bars radially from the outside to the inside or vice-versa in the section of the tooth crests of the teething is possible. The extension of the teeth in the circumferential direction is called width. The design of the teeth as described above has the advantage, that the remaining tooth crest portions and/or tooth crests can be used for supporting the body of the teething. Thereby, each tooth of the teething can be supported.

Another preferred embodiment of the torque transfer device is characterized in that the body of the teething is provided conically at its head circle towards the open ends. Thereby, a wedging between these two components is facilitated when inserting or implanting the connection component onto the teething body. Thereby, an undesired radial clearance can be reduced or removed.

Another preferred embodiment of the torque transfer device is characterized in that the bars extend in radial direction. Preferably, several bars are distributed over the circumference of the connection component like spokes.

Another preferred embodiment of the torque transfer device is characterized in that the bars extend in circumferential direction between two bar windows respectively, which are provided in the connection component. The bar windows are provided substantially rectangular.

Another preferred embodiment of the torque transfer device is characterized in that the connection component has finger windows, allowing reaching through with fingers, wherein said finger windows extend from a pressure ring, or from the pressuring. Through the pressure ring, the disk packet of the associated multi-disk clutch is coupled with the operating lever device.

Another preferred embodiment of the torque transfer device is characterized in that the connection components comprise half the number of finger windows, than teeth. This division has proven to be particularly advantageous in the context of the present invention.

Another preferred embodiment of the torque transfer device is characterized in that the connection component has as many finger windows, as bar windows. Preferably, a bar window is associated with each finger window.

Another preferred embodiment of the torque transfer device is characterized in that the finger windows are disposed radially inside, and overlapping with the bar windows. Thereby, an even weight distribution is accomplished.

Another preferred embodiment of the torque transfer device is characterized in that the finger windows and/or the bar windows are disposed evenly distributed in circumferential direction. Thereby, the assembly is simplified.

Another preferred embodiment of the torque transfer device is characterized in that the connection component reaches around the outer disk carrier of the outer multi disk clutch and/or supports outward located tooth crests of the outer disk carrier of the outer multi disk clutch in radial direction. Thereby, the rotation-speed strength is increased.

Another preferred embodiment of the torque transfer device is characterized in that the connection component has an inner teething, which is engaged with an outer teething of the teething body of the outer disk carrier of the inner multi-disk clutch. According to another aspect of the invention the backside of the disk teething is used for producing the non-rotatable connection or the insertable connection.

Another preferred embodiment of the torque transfer device is characterized in that the teething body has protruding grooves, which constitute an axial stop for the connection component. The grooves are portions, which are punched out, or pressed out from the material of the teething body between two teeth.

Another preferred embodiment of the torque transfer device is characterized in that the protruding grooves are disposed symmetrically with reference to the middle of the bars of the connection component. Thereby, the strength of the insertable connection is increased.

Another preferred embodiment of the torque transfer device is characterized in that each second tooth of the teething body of the outer disk carrier of the inner multi-disk clutch has a protruding groove. Thereby, a high stability of the insertable connection is facilitated.

Another preferred embodiment of the torque transfer device is characterized in that the outer disk carrier of the outer disk clutch includes a teething with the same number of teeth, as the teething body of the outer disk carrier of the inner multi-disk clutch. This has proven particularly advantageous in the context of the present invention.

In a torque transfer device according to the present invention, the object described above is accomplished through the outer disk carrier of the outer multi-disk clutch, comprising a teething body, which is connected with the connection component, through an insertable teething. Thereby the assembly is facilitated.

A preferred embodiment of the torque transfer device is characterized in that tooth windows are provided in the connection component. The tooth windows are pass-through holes, which extend in axial direction through the connection component.

Another preferred embodiment of the torque transfer device is characterized in that the tooth windows respectively comprise at least one radially inward extending outer tooth. The outer tooth is preferably centrally located in the tooth window.

Another preferred embodiment of the torque transfer device is characterized in that the tooth windows comprise at least one radially outward extending inner tooth. Preferably, one outer tooth is disposed between two inner teeth.

Another preferred embodiment of the torque transfer device is characterized in that the disposition of the inner teeth and/or of the outer teeth is selected so that a punch dye has a sufficient cross section. Thereby, the manufacture through stamping is facilitated.

Another preferred embodiment of the torque transfer device is characterized in that the outer disk carrier of the outer multi-disk clutch is supported in the radial direction at the outer teeth, in particular, at the flanks of the outer teeth of the connection component. Thereby, the rotation-speed strength is increased. According to a further aspect of the invention, the backside of the disk teething is used for establishing the non-rotatable connection, or the insertable connection.

Another preferred embodiment of the torque transfer device is characterized in that the teething body of the outer disk carrier of the outer multi-disk clutch has protruding grooves forming an axial stop for the connection component. The grooves are preferably portions which are pressed out from the material of the teething body between two teeth.

Another preferred embodiment of the torque transfer device is characterized in that the protruding grooves are disposed symmetrically with reference to the middle of the tooth windows of the connection component. Thereby, the strength of the insertable connection is increased.

Another preferred embodiment of the torque transfer device is characterized in that every second tooth of the teething body of the outer disk carrier of the outer multi-disk clutch has a protruding groove. Thereby, a stable stop for the connection component is provided.

Another preferred embodiment of the torque transfer device is characterized in that the teething body of the outer disk carrier of the outer multi-disk clutch has the same number of teeth as the teething body of the outer disk carrier of the inner multi-disk clutch. Both teething bodies comprise, e.g., 36 teeth.

Another preferred embodiment of the torque transfer device is characterized in that the connection component comprises finger windows allowing reaching through with fingers, wherein said finger windows extend from a pressure ring. The pressure ring serves for coupling a disk packet with an operating lever device.

Another preferred embodiment of the torque transfer device is characterized in that the connection component has half as many finger windows and/or tooth windows as it has teeth. This distribution has proven to be very advantageous in the context of the present invention.

Another preferred embodiment of the torque transfer device is characterized in that the finger windows are disposed radially within the tooth windows. A finger of the pressure ring extends through each finger window of the pressure ring.

Another preferred embodiment of the torque transfer device is characterized in that the finger windows and/or the tooth windows are disposed evenly distributed in circumferential direction. Thereby, the occurrence of an imbalance is avoided.

Another preferred embodiment of the torque transfer device is characterized in that the finger windows and/or the tooth windows are distributed in the middle between the protruding grooves. This layout has proven to be particularly advantageous in the context of the present invention.

Another preferred embodiment of the torque transfer device is characterized in that the finger windows and/or the tooth windows extend over three teeth, in particular in circumferential direction. Preferably, each tooth window has two outer teeth and an inner tooth.

Another preferred embodiment of the torque transfer device is characterized in that the number of the teeth of the disk teething is divisible by two and by three.

The invention furthermore relates to a drive train of a motor vehicle, comprising a torque transfer device as described above.

BRIEF DESCRIPTION OF THE DRAWINGS

Further advantages, features, and details of the invention result from the subsequent description, in which various embodiments are described in detail with reference to the drawing where.

DETAILED DESCRIPTION OF THE INVENTION

Figure 1:
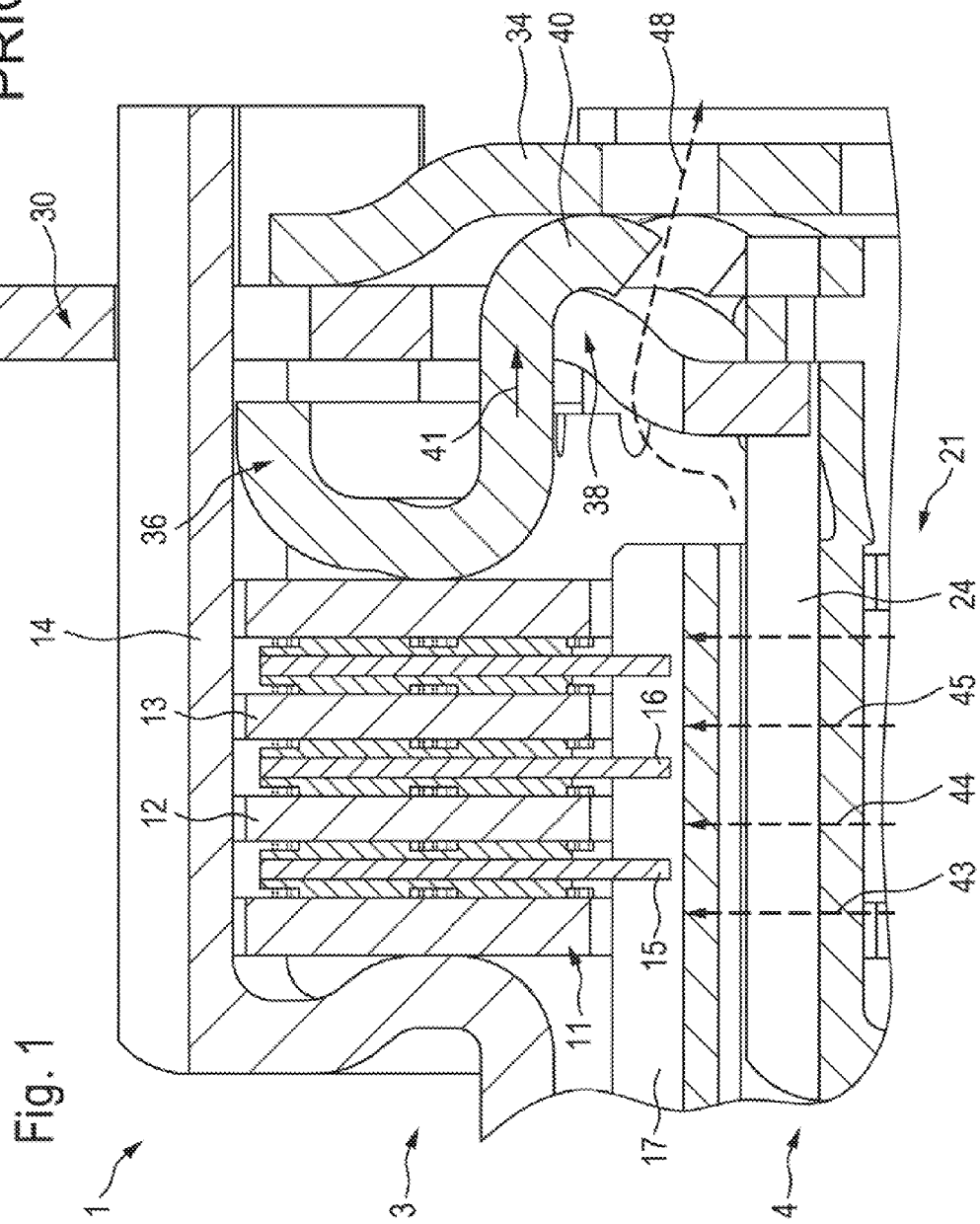
FIG. 1 is an illustration of a partial cross section in longitudinal direction through a state of the art torque transfer device.

In FIGS. 1, 2, 3, 4, 11, 12, 13, 14, 27, 28, a section of a drive train of a motor vehicle is shown respectively in different views. Between a drive unit, in particular of a combustion engine, from which a crank shaft extends, and a transmission, wet running twin clutch 1 in multi-disk construction is disposed.

Twin clutch 1 comprises radially outer multi-disk clutch 3 and radially inner multi-disk clutch 4, which is disposed overlapping in the axial direction with respect to radially outer multi-disk clutch 3. Radially outer multi-disk clutch 3 comprises disk packet 11 with outer disks 12, 13, connected non-rotatably with outer disk carrier 14. The disk packet furthermore comprises inner disks 15, 16, connected non-rotatably with inner disk carrier 17. Radially inner multi-disk clutch 4 comprises disk packet 21, which, as can be seen in the embodiment shown in FIG. 3, comprises outer disks 22, 23, which are connected non-rotatably with outer disk carrier 24. Disk packet 21 furthermore comprises inner disks 25, 26, which are connected non-rotatably with inner disk carrier 27.

Outer disk carrier 14, which is also designated as outer disk carrier of radially outward multi-disk clutch 3, is connected non-rotatably through connection component 30 with outer disk carrier 24, which is also designated as outer disk carrier of radially interior multi-disk clutch 4. Connection component 30, which is also designated as carrier device, is provided substantially annular and is thus also designated as carrier ring. Multi-disk clutch 3 is operated through operating lever assembly 34. Operating lever assembly 34 is coupled with disk packet 11 through putting pressure transfer device 36 in between. Pressure transfer device 36 is provided substantially annular and is thus also designated as pressure ring 36. Pressure ring 36 is clamped in axial direction between disk packet 11 and operating lever assembly 34.

Pressure ring 36 has several fingers 40, at least partially extending in the axial direction, extending through pass-through holes 36, which are cut out from connection component 30, as indicated by arrow 41. Pass-through openings 38 are also designated as finger windows. Through arrows 43 through 45 it is indicated that a cooling medium is passed through disk packets 11, 21 in the radial direction in order to cool the disks.

A wet clutch uses a special cooling medium, like cooling oil, in order to conduct away heat, which is generated at the disks during operation. The medium has to be conducted to the disks from a cooling cycle. Friction liners are disposed on so-called friction disks. For liner cooling, the cooling oil flows between the steel disks and the friction disks, wherein a temperature exchange can take place. Grooves in the liners conduct the oil from radial inner multi-disk clutch 4 radially to the outside and to radially outer multi-disk clutch 3. After cooling the disks of two disk packets 11, 21, the cooling medium mixes with the oil in the transmission sump. From here, it is pumped to the cooler and, from there, again back into the clutch.

In FIG. 1 it is indicated through arrow 48 that part of the cooling medium escapes through the pass-through openings, or finger windows 38 in axial direction to the outside. This leads to a bad pump efficiency and oil distribution. According to an important aspect of the invention, pass-through openings 38, or the finger windows, are sealed through a seal device or sealing device or a seal component. Preferably, the seal component or the seal device works together with the pressure ring.

Through the design according to the invention, a possibly present leakage gap can be minimized and cooling can be optimized. According to an important aspect of the invention, pass-through holes or finger windows 38 through the seal device are closed at least partially. Thereby, the leakage can be substantially reduced. This, in turn leads to using a weaker or smaller pump, which influences the fuel consumption positively.

Figure 2:
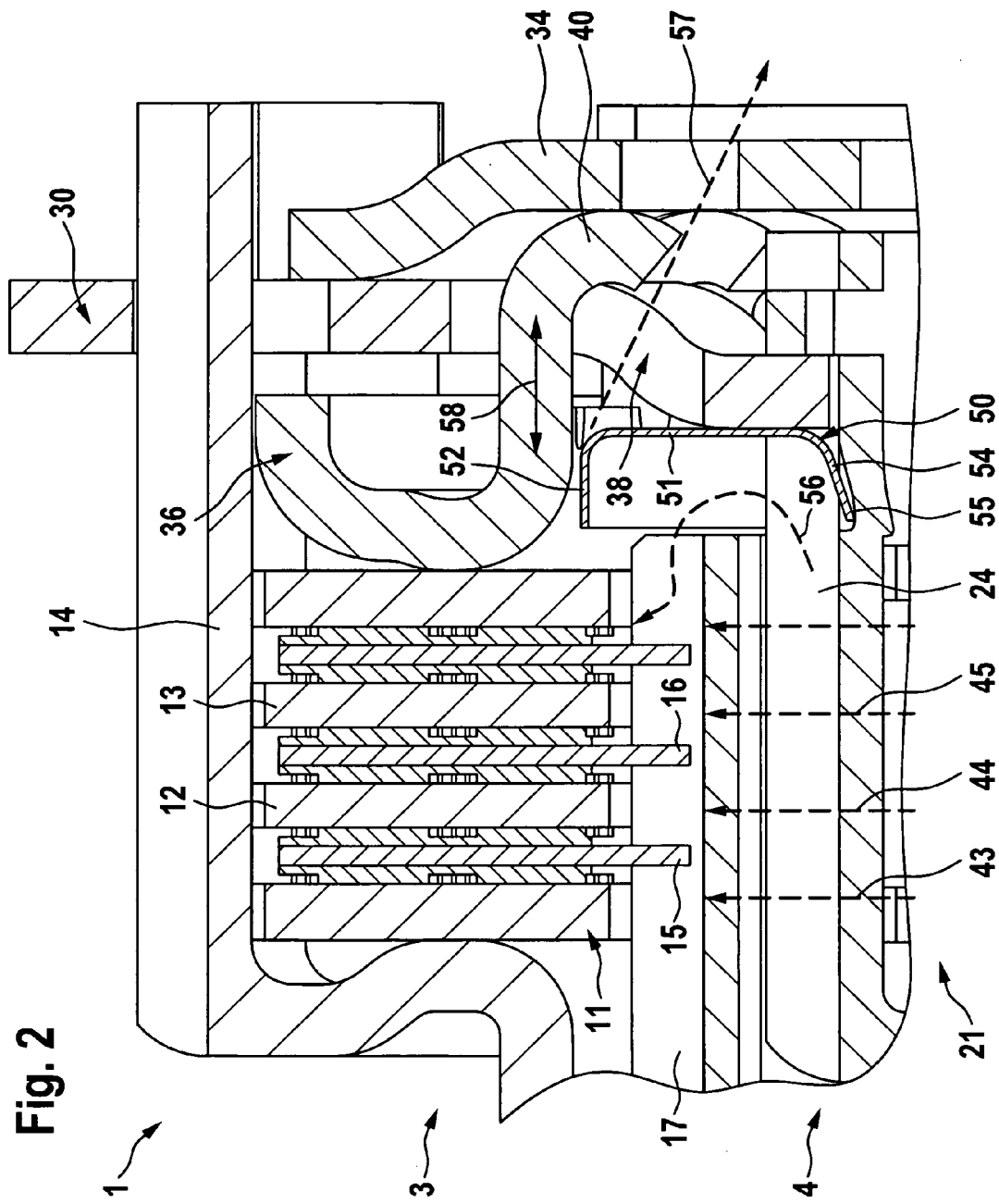
FIG. 2 is an illustration similar to FIG. 1 according to an embodiment of the invention.

In the embodiment shown in FIG. 2, seal device 50 is disposed in the portion of pass-through openings 38. Seal device 50 comprises seal ring 51, which substantially has the shape of a circular disk. Seal ring 51 has angled arm 52, radially on the outside. Radially on the inside, seal ring 51 has protrusions or fingers 54, engaging into groove or grooves 55, which are cut out in outer disk carrier 24. It is indicated through arrow 56, that the major percentage of the cooling medium moves from radially inner disk packet 21 to radially outer disk packet 11. Through another arrow 57, it is indicated that only a minor leakage escapes through finger windows 38. Through double arrow 58, it is indicated, that pressure ring 36 moves in the axial direction, when operating multi-disk clutch 3.

Figure 3:
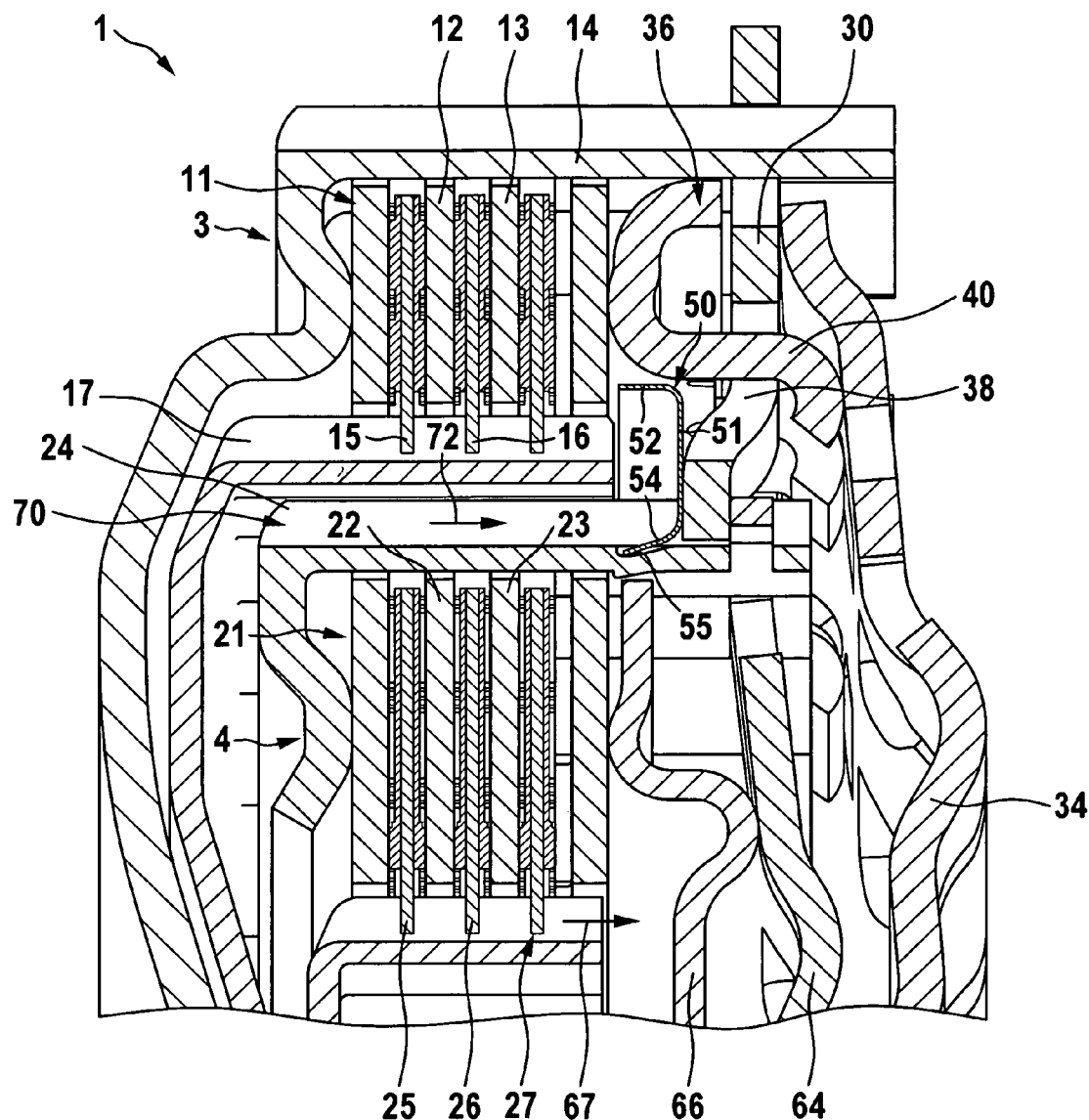
FIG. 3 is an enlarged cutout of a torque transfer device, as it is shown in FIG. 2, in a longitudinal cut view.

In FIG. 3, it is visible that radially interior multi-disk clutch 4 is operated through operating lever device 64. Between operating lever device 64 and disk packet 21, pressure transfer device 66 is clamped. Pressure transfer device 66 is an enclosed pressure ring. Through crossed out arrow 67, it is indicated that no cooling medium can escape through enclosed pressure ring 66. Outer disk carrier 24 is provided with outer teething 70, which would allow the escape of oil in axial direction. Through crossed out arrow 72, it is indicated that seal device 50 safely avoids an escape of cooling medium in axial direction through pass-through holes 38.

In a twin clutch, as illustrated in FIG. 3, it can be problematic that outer disk carrier 24 is only supported on one side in radial direction. During transportation, outer disk carrier 24 and other parts of the twin clutch could move axially. This could lead to the disks of disk packet 21 of radial inner disk clutch 4 being able to fall out in the axial direction.

According to a major aspect of the invention, a transport safety function is integrated into seal device 50, which is also designated as seal component. Through lugs or fingers 54 of seal device 50, engaging into grooves 55 of disk carrier 24, outer disk carrier 24 is safely held in position. As an alternative to the grooves, protruding hooks or holes can be provided. Through the transport device according to the invention an undesired axial movement of the parts is safely avoided. Seal device 50 is stamped and formed from a sheet metal part and formed.

Figure 4:
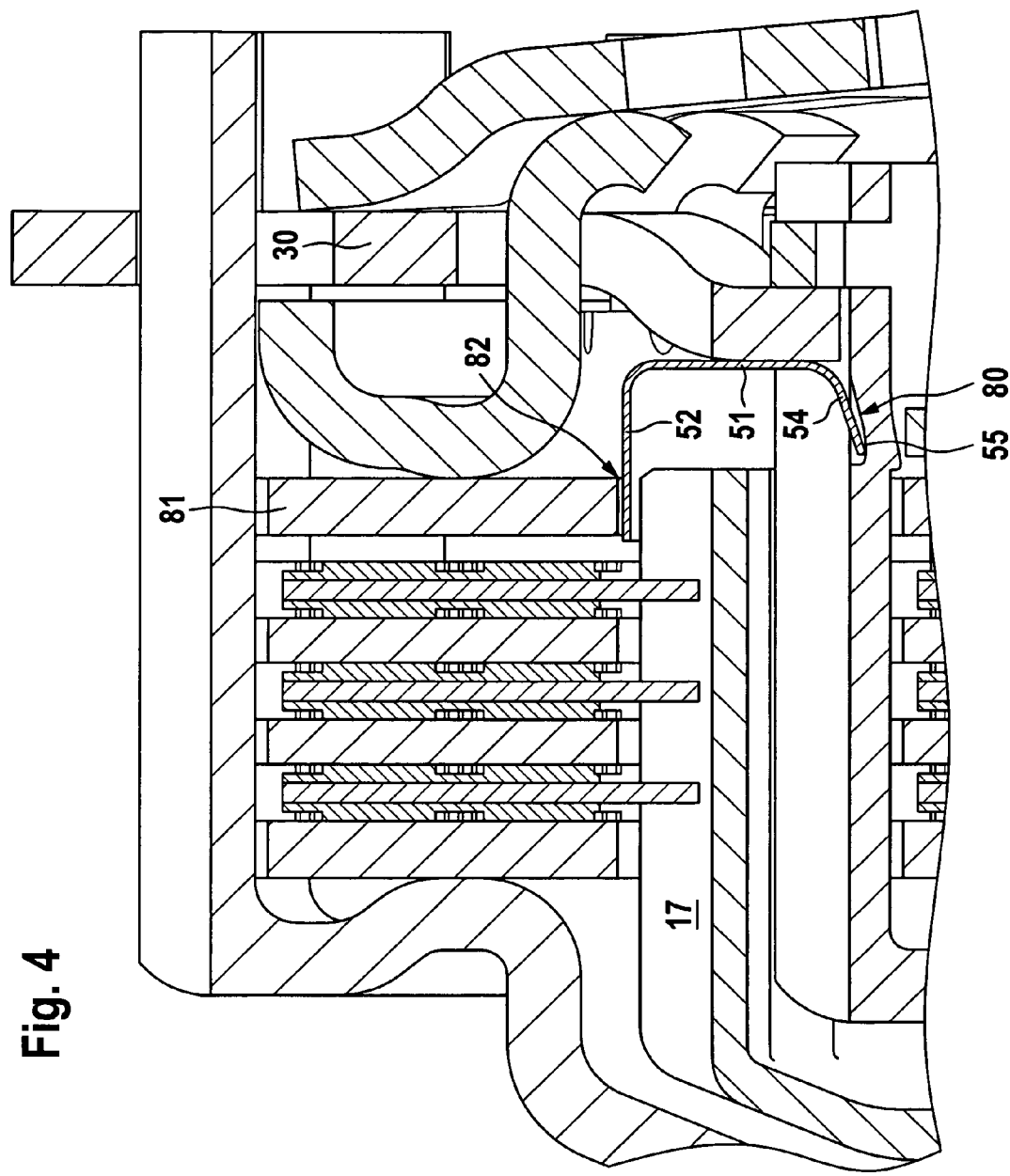
FIG. 4 is a similar illustration as in FIG. 2 according to another embodiment.
Figure 5:
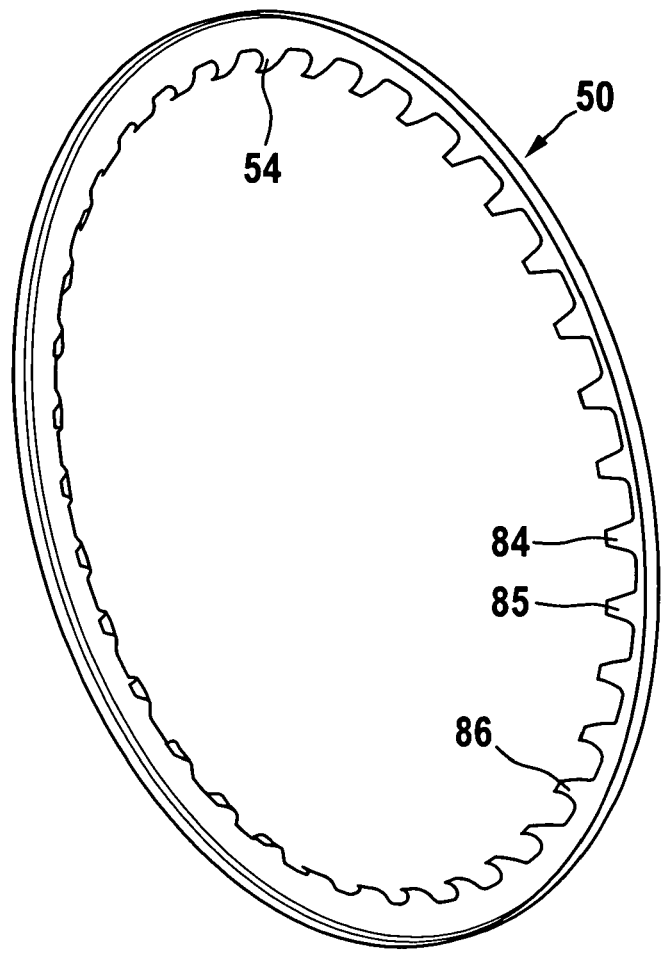
FIG. 5 is a perspective illustration of a seal device according to the invention.
Figure 6:
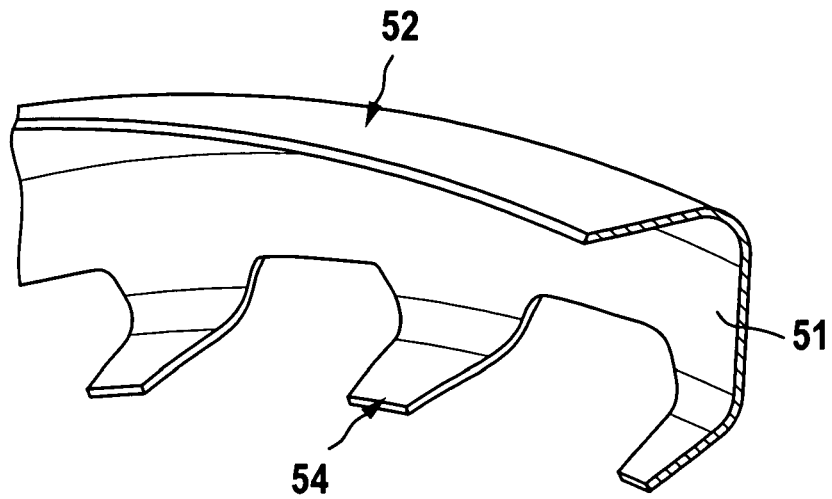
FIG. 6 is an enlarged cutout from FIG. 5.

In the embodiment, illustrated in FIG. 4, seal device 80 is installed, which is similar to seal device 50 of the preceding embodiment. However, in the embodiment shown in FIG. 4, the end of arm 52 is disposed in radial direction between inner disk carrier 17 and end disk 81. Thereby, seal location 82 is created in a simple manner. In FIG. 5, seal device 50 is shown in perspective view. FIG. 5 shows that seal device 50 comprises plurality of lugs or fingers 54, 84, 85, 86. Angled arm 52 forms seal surface 52. In FIG. 6 an enlarged cutout of FIG. 5 is shown.

Figure 7:
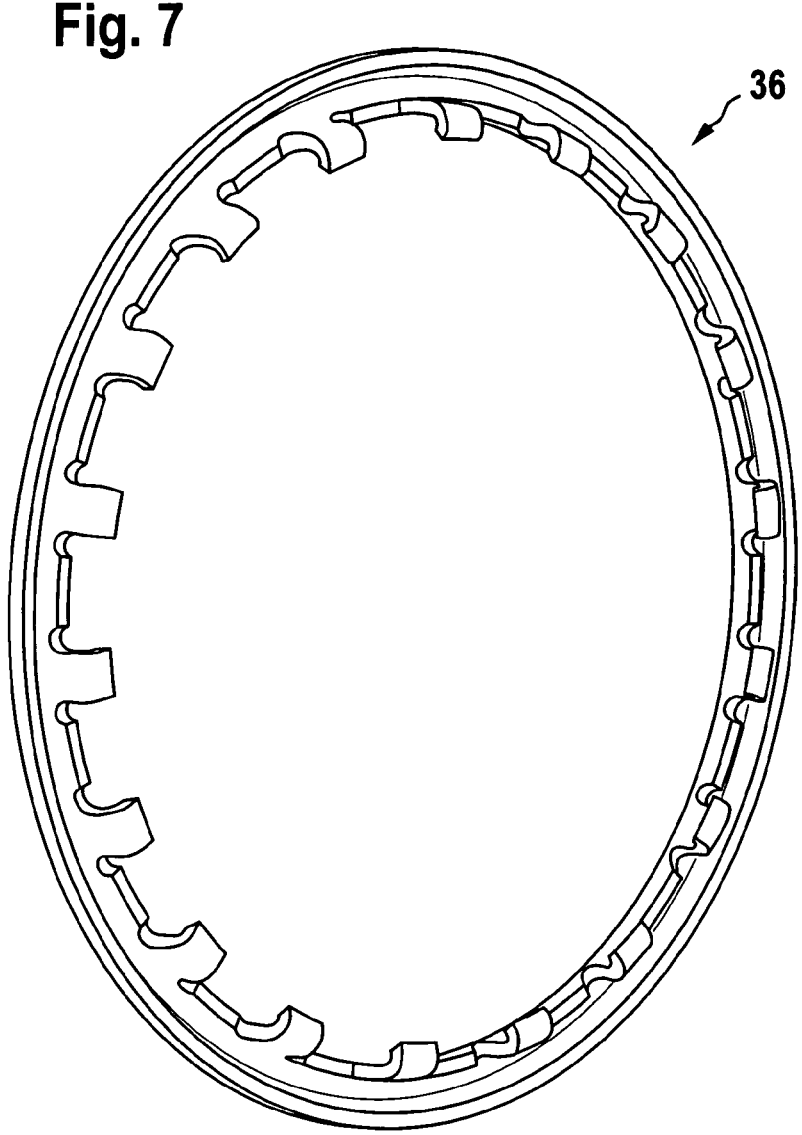
FIG. 7 is a perspective illustration of a pressure ring according to the invention.
Figure 8:
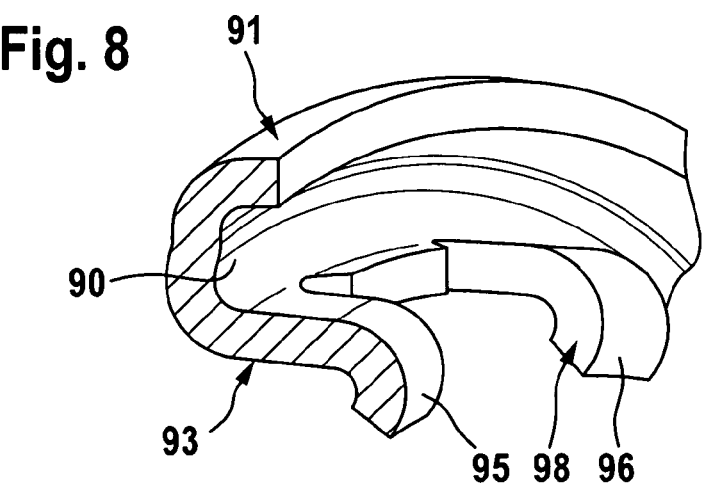
FIG. 8 is an enlarged cutout from FIG. 7.

In FIGS. 7 and 8, pressure ring 36 is shown in a perspective view. Pressure ring 36 comprises ring body 90, comprising bent over rim area 91. Pressure ring 36 can be formed of steel. Surrounding rim area 91 creates a centering surface. Seal surface 93 is created through another bent over rim area, so that pressure ring 36 has a C-shaped or U-shaped cross section. Pressure ring 36 has plurality of curved fingers 95, 96. Fingers 95, 96 can comprise centering surfaces 98 or centering flanks, which can be used for flank centering. Through the backward shaped rim areas the stiffness of pressure ring 36 is increased.

Figure 9:
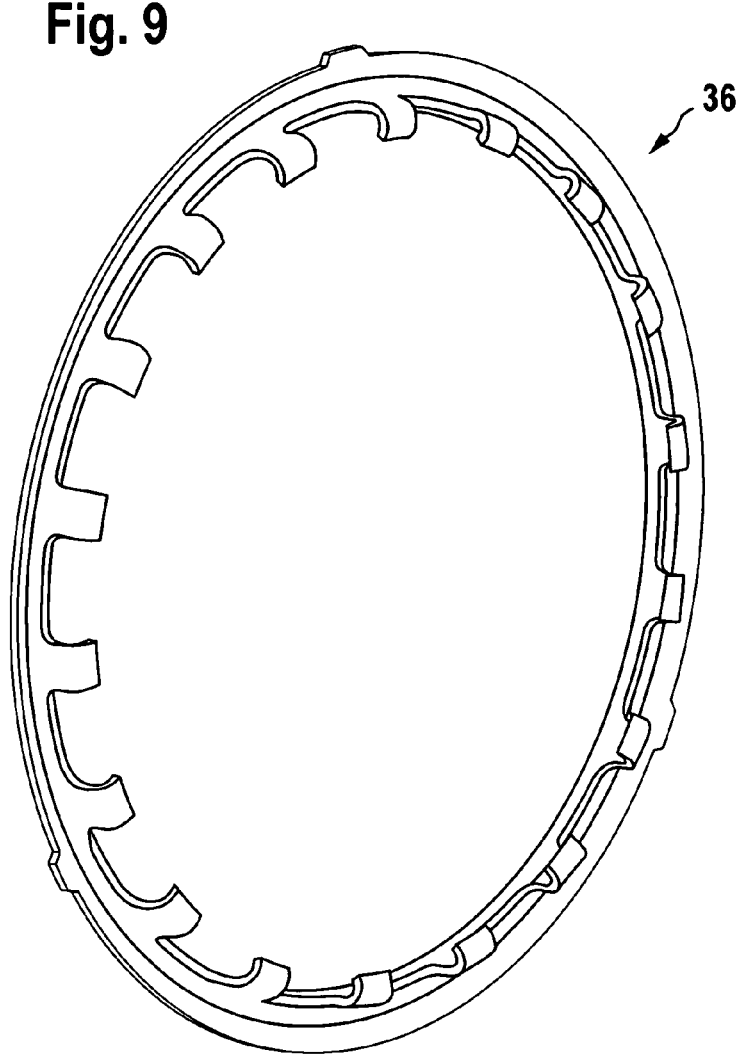
FIG. 9 illustrates a similar pressure ring, like in FIG. 7, according to another embodiment.
Figure 10:
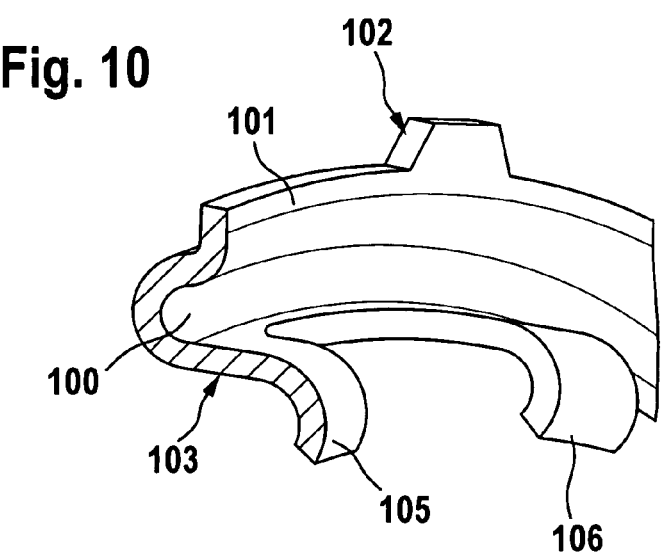
FIG. 10 is an enlarged cutout from FIG. 9.

In FIGS. 9 and 10, an additional embodiment of pressure ring 36 is shown. Pressure ring 36 shown in FIGS. 9 and 10 comprises ring body 100 with bent over or bent back rim area 101. On the radial outside, teeth 102 are formed at rim area 101, whose flanks run together towards the outside. Teeth 102 serve for centering pressure ring 36. The seal surface of pressure ring 36 is designated as 103. Furthermore, pressure ring 36 comprises plurality of fingers 105, 106.

Figure 12:
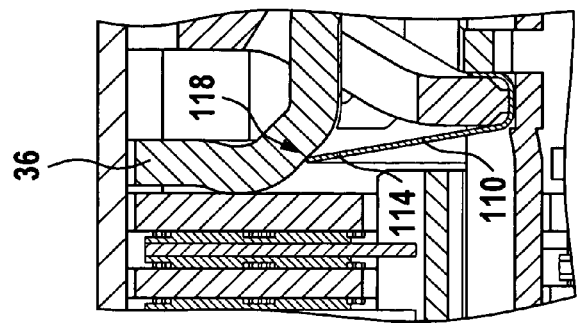
FIG. 12 is a cutout from FIG. 11 with the clutch closed.
Figure 11:
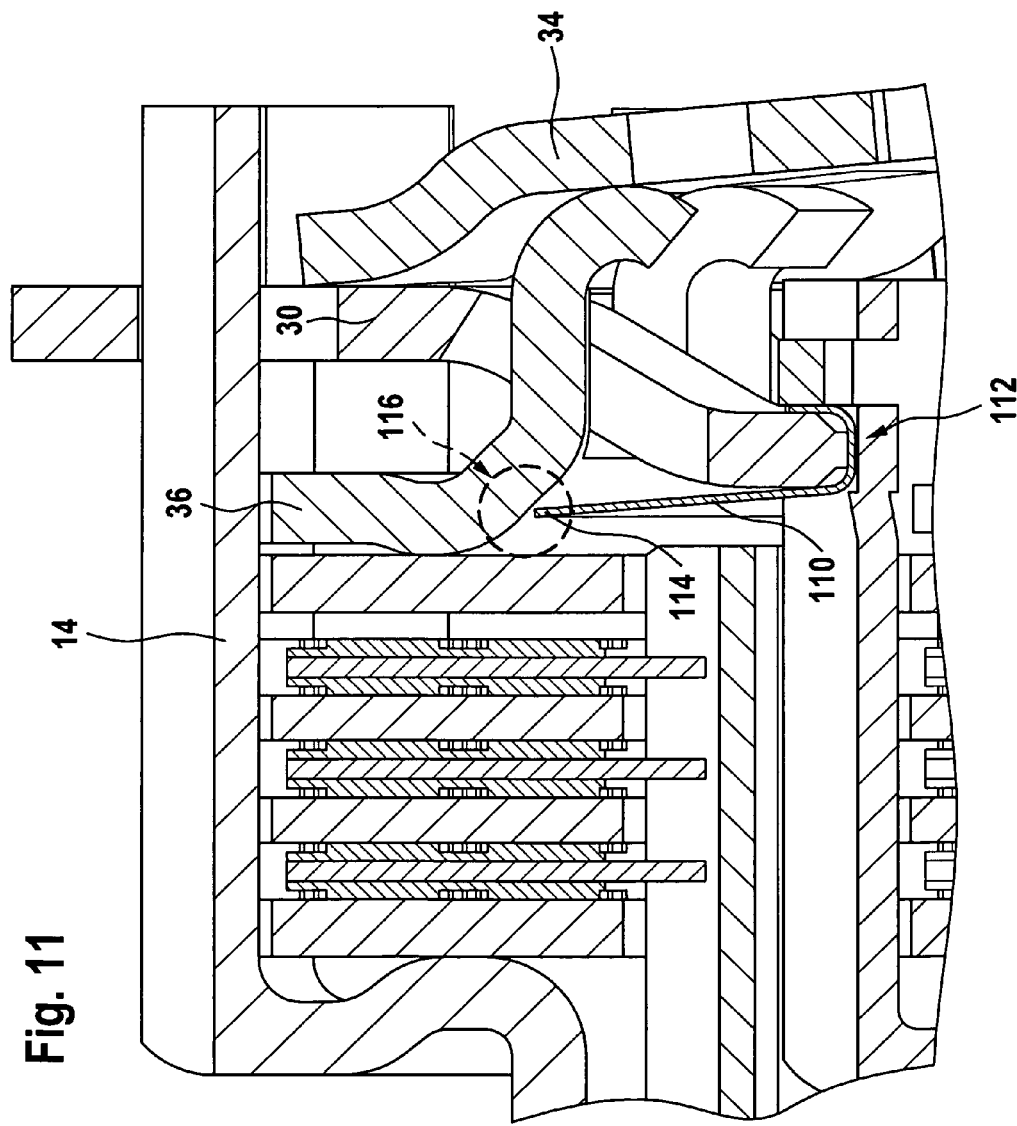
FIG. 11 is a similar illustration as in FIG. 2 according to another embodiment.

According to another aspect of the invention the seal device is provided as a spring. For this purpose, the seal component, or the seal device can be stamped and formed from a sheet material, in particular, a spring sheet metal material. In FIGS. 11 and 12, a wet running twin clutch with seal device 110 is illustrated. Seal device 110 comprises in cross section view U-shaped positioning section 112, radially extending around the radially inner rim area of carrier ring 30. Through circle 116, it is emphasized that in the open state of the clutch illustrated in FIG. 11 a gap between free end 114 of seal device 110 and pressure ring 36 is provided.

In FIG. 12, the closed state of the clutch is illustrated. As can be seen, the gap is closed at location 118, when the clutch is closed. This means, through the resiliency of seal device 110, it is clamped, when pressure ring 36 is moved for locking the clutch. This leads to a situation, where the spring effect of seal device 110 helps opening the clutch. Through the gap, when the clutch is open, the tension in seal device 110 and the compression force, and thus the production costs of the actuation system can be reduced. The gap shown in FIG. 11 in circle 116 also positively affects the drag moment with the clutch open, since the cooling media, or the cooling oil can escape through the gap. Seal device 110 shown in the FIGS. 11 and 12 can be provided with lugs, fingers, or hooks, as in the previous embodiments.

Figure 13:
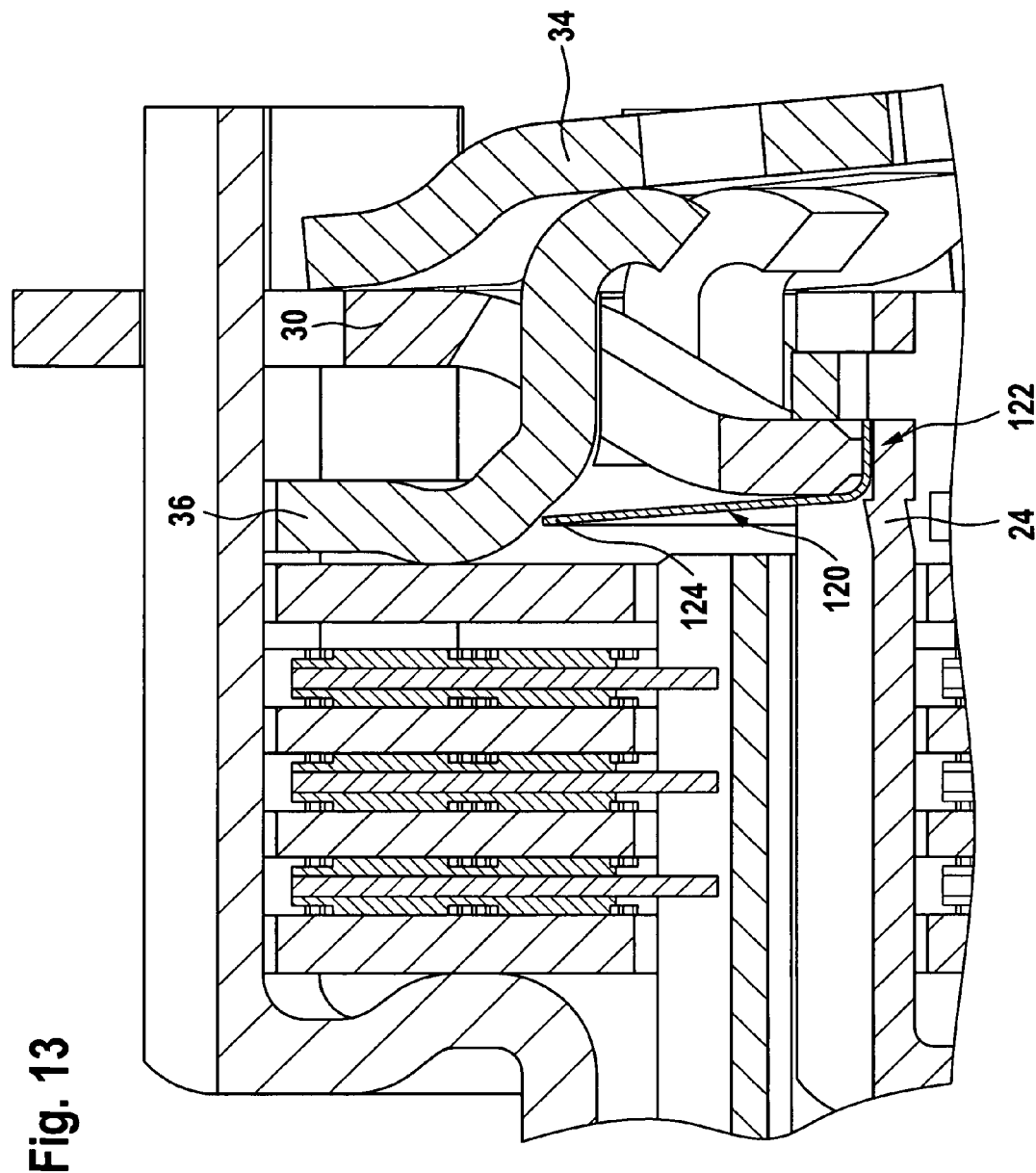
FIG. 13 is an illustration like in FIG. 11 according to another embodiment.

In FIG. 13, a twin clutch with seal device 120 is shown, comprising an L-shaped cross section with contact section 122. Contact section 122 is disposed in radial direction between outer disk carrier 24 and carrier ring 30. Between free end 124 of seal device 120 and pressure ring 36, a small gap is present.

Figure 14:
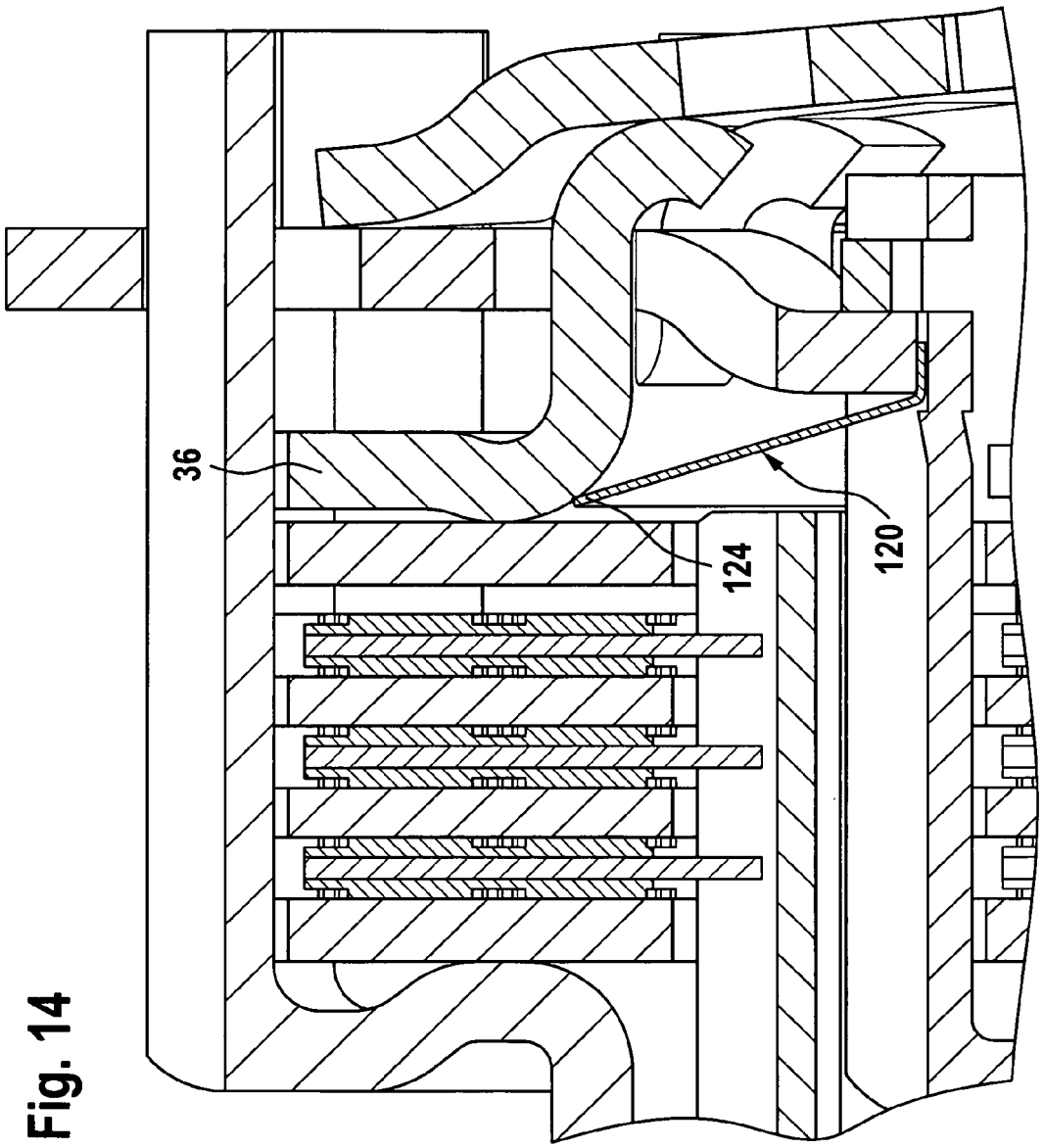
FIG. 14 is an illustration like in FIG. 13 according to another embodiment.

In the embodiment illustrated in FIG. 14, seal device 120 is provided as a spring. The gap between free end 124 and seal device 120 and pressure ring 36 is closed through a suitable spring preload.

In FIGS. 15 through 20, the assembly of connection component 30 with outer disk carrier 24 of radially interior multi-disk clutch 4 (FIGS. 2 and 3) and pressure ring 36 and seal device 50 is shown in various views and assembly steps. Through a bayonet lock or a bayonet setting, connection component 30, pressure ring 36, and outer disk carrier 24 are fixated in axial direction through seal device 50 in assembled state.

Figure 15:
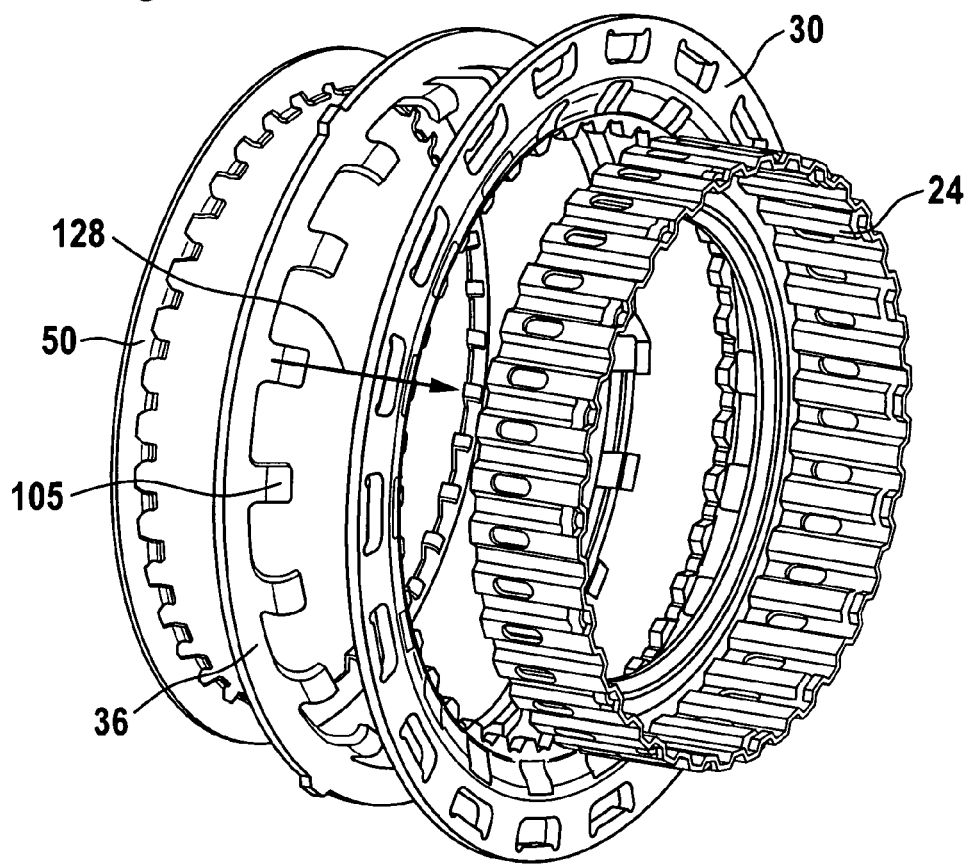
FIGS. 15-20 illustrate the assembly of a torque transfer device according to the invention with a bayonet lock.
Figure 16:
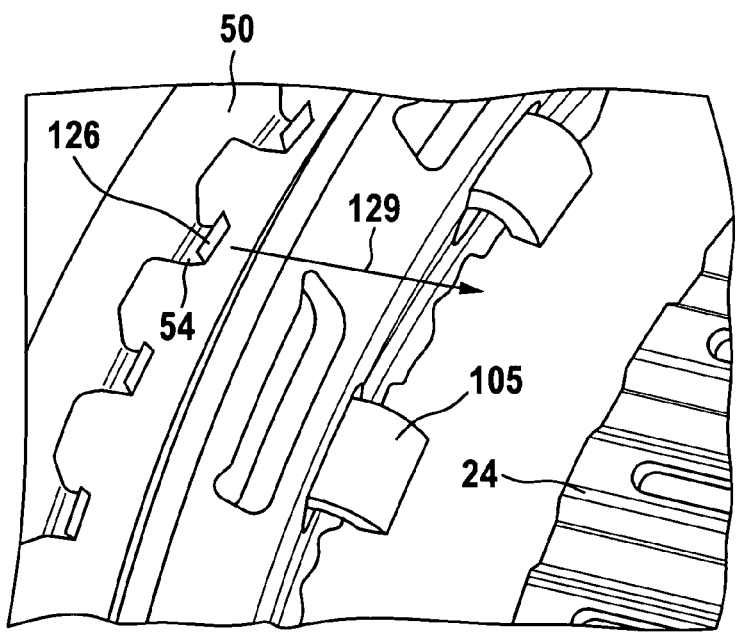

In FIG. 15, it is indicated through arrow 128 that fingers 105 of pressure ring 36 are run through the finger windows in connection component 30 during assembly. In FIG. 16, it becomes evident that finger 105 is placed through the finger window in connection component 30. Through arrow 129 in FIG. 16, it is indicated that bent over end 126 of seal device 50 is passed through in the area of the base of the tooth along the inner teething of connection component 30 in axial direction.

Figure 17:
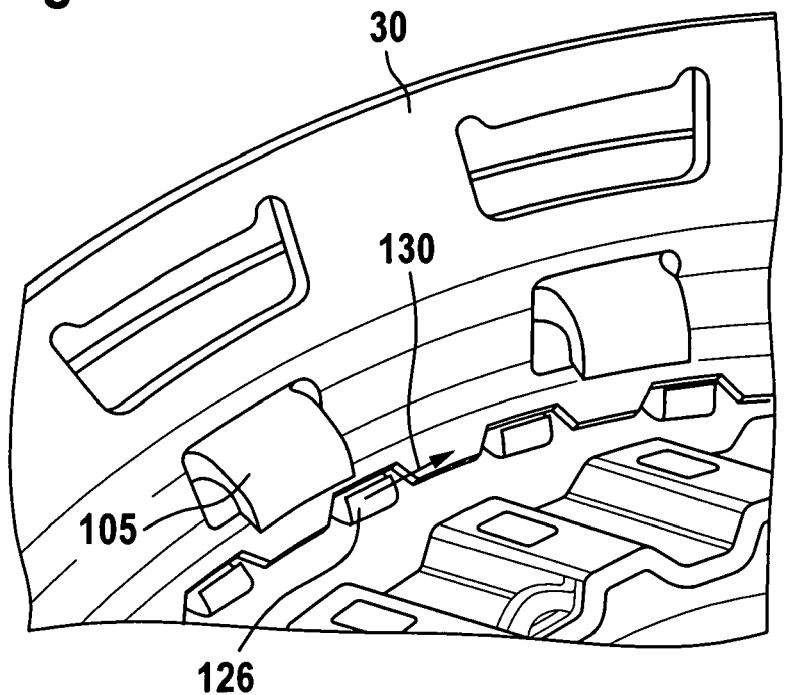
Figure 18:
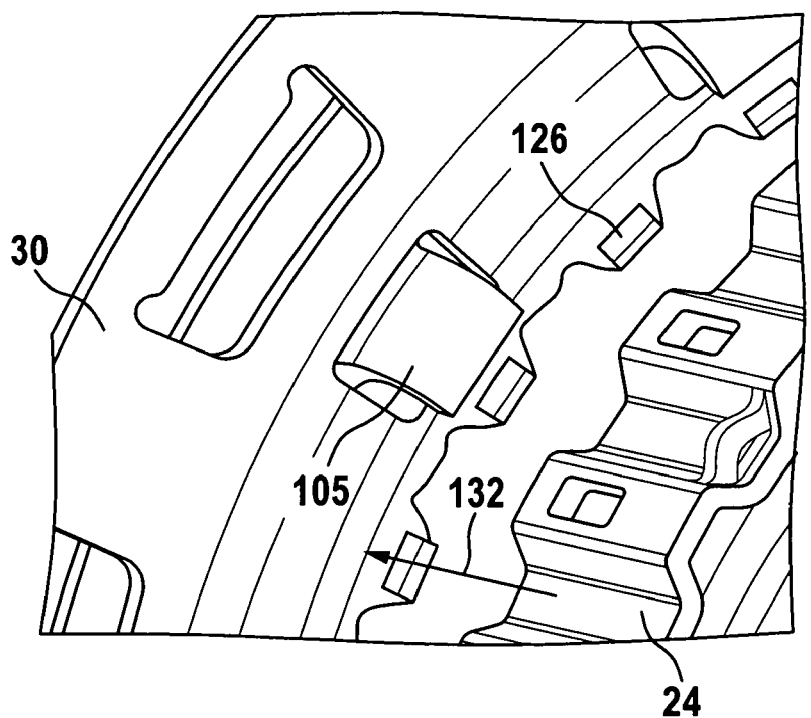

In FIG. 17, it is visible that the seal device with bent over end 126, as indicated through arrow 130, is rotated in circumferential direction in order to come into engagement with a tooth of the inner teething of connection component 30. Through the interaction between hook shaped bent over end 126 of seal device 50 with the tooth at the inner teething of connection component 30, a bayonet lock shaped connection is established. In FIG. 18, it is indicated by arrow 132, that after generating the bayonet lock, outer disk carrier 24 is brought into engagement with an outer teething with the inner teething of connection component 30.

Figure 19:
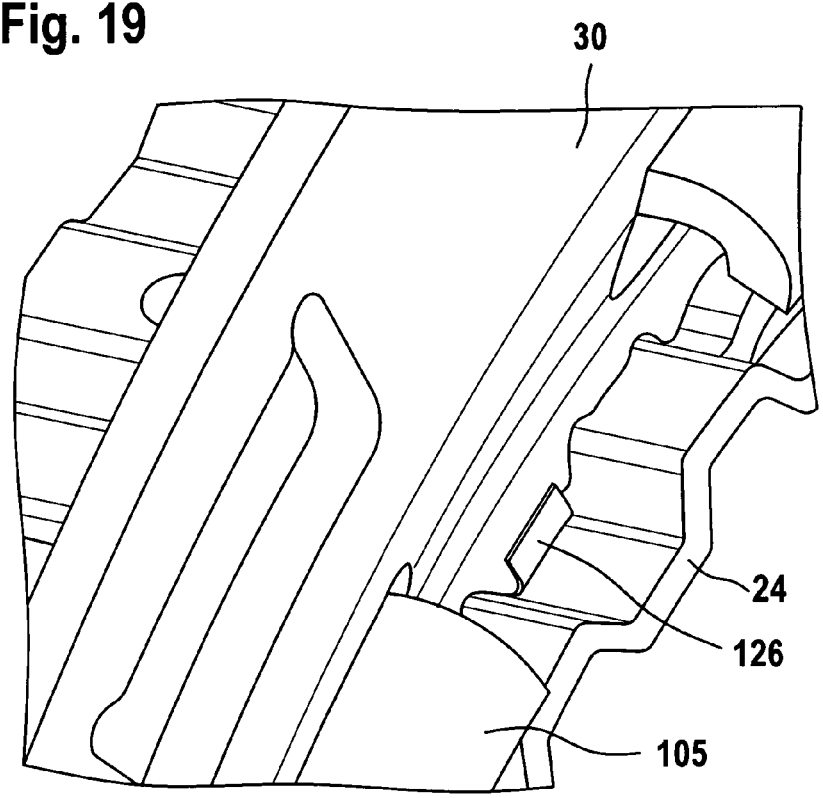
Figure 20:
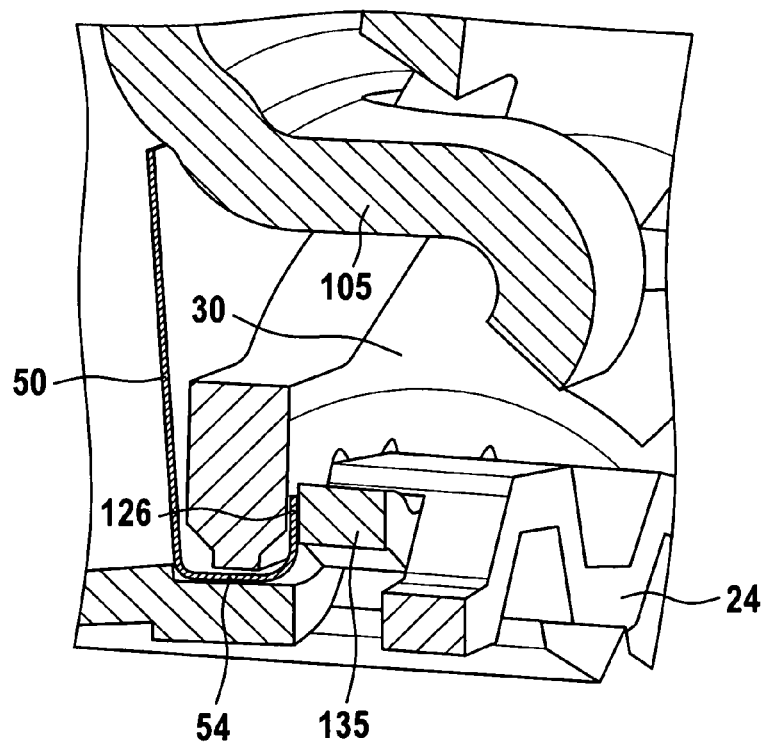

In FIG. 19, it is visible, that bent over end 126 of seal device 50 is disposed between two teeth of the outer teething of outer disk carrier 24. In FIG. 20, it is visible that groove 135 protruded between two teeth of the outer teething, or the teething of outer disk carrier 24, comes in contact with bent over end 126 of seal device 50, so that bent over end 126 is wedged in axial direction between connection component 30 and protruded groove 135.

Figure 21:
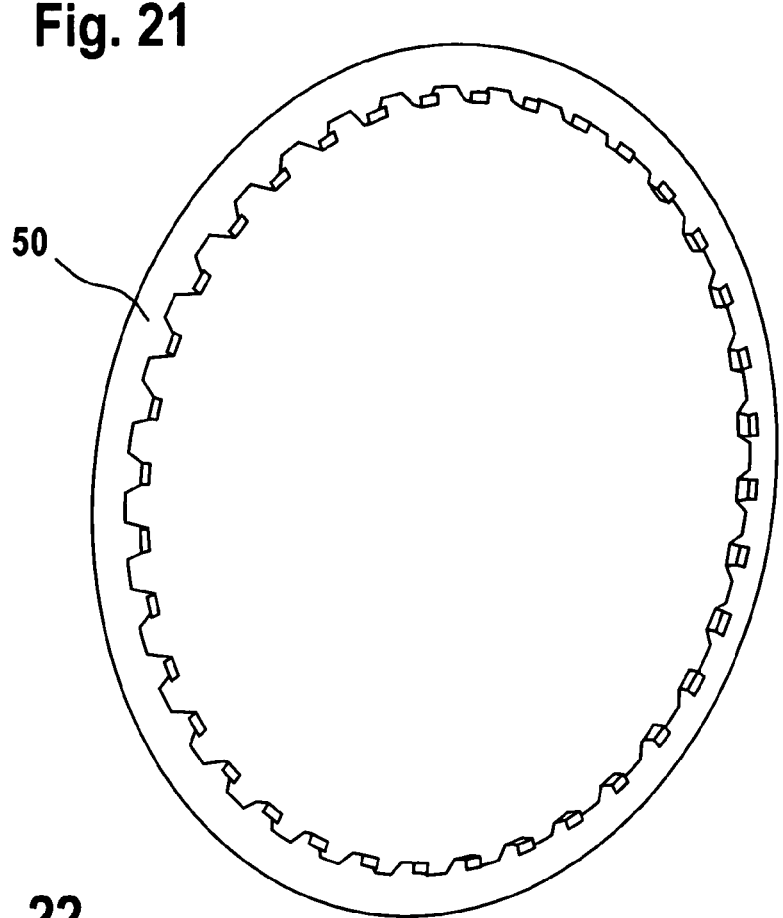
FIG. 21 is a perspective view of a seal device according to another embodiment.
Figure 22:
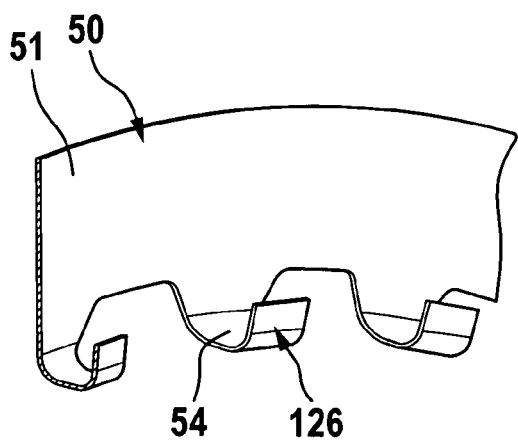
FIG. 22 is an enlarged cutout from FIG. 21.

In FIG. 21, seal device 50 is shown in a perspective view. In FIG. 22 a cutout from FIG. 21 is shown in an enlarged view. From seal ring 51, on the radial inside, a plurality of fingers or lugs 54 are angled. The ends of lugs or fingers 54 are bent over at their ends 126.

Figure 23:
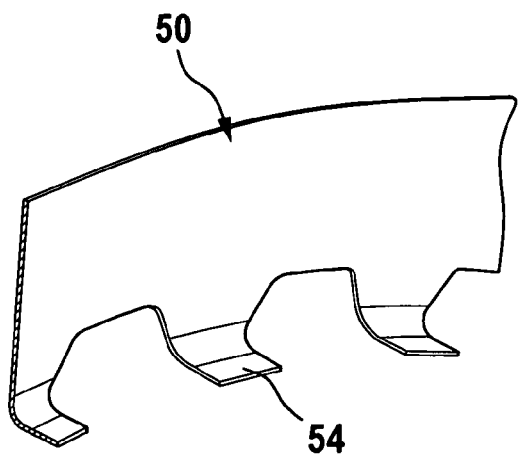
FIG. 23 is the same cutout as in FIG. 22 according to another embodiment.

In FIG. 23, the same cutout as in FIG. 22 is illustrated according to another embodiment. In FIG. 23, it is visible, that protrusions 54 of seal device 50 can also be provided without a bent over end.

Figure 24:
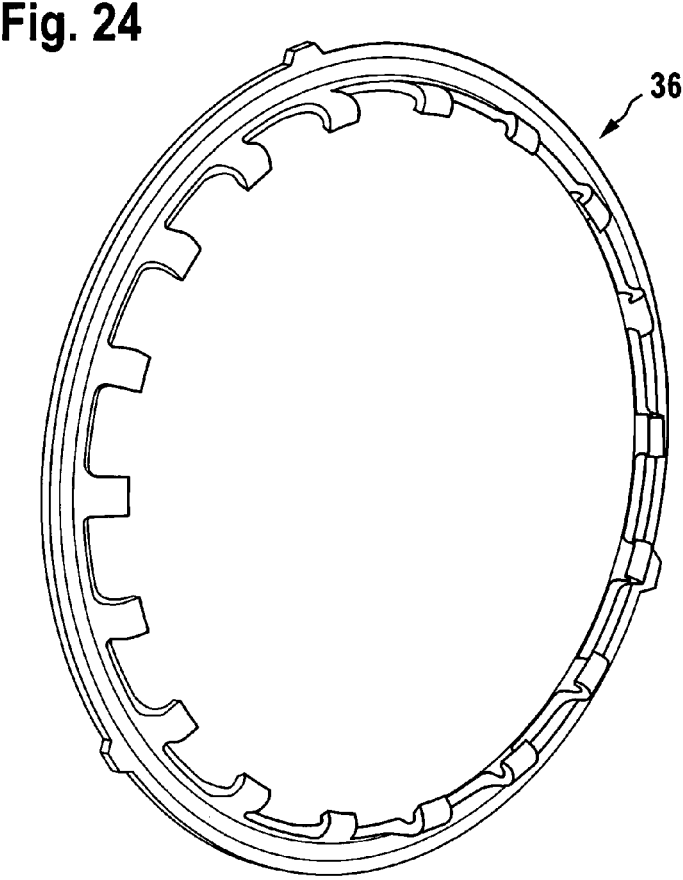
FIG. 24 is a perspective view of a pressure ring according to another embodiment.
Figure 25:
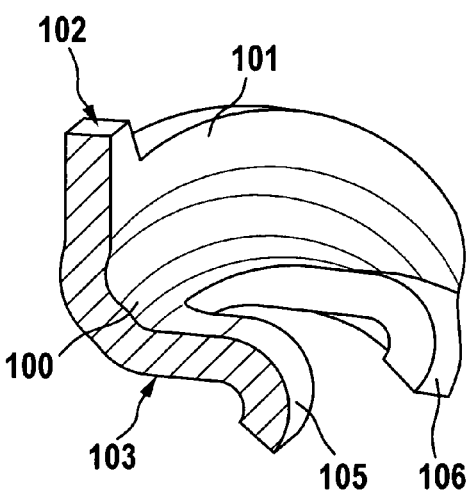
FIG. 25 is an enlarged cutout from FIG. 24.

In FIG. 24, pressure ring 36 is shown in a perspective view. In FIG. 25, a cutout from FIG. 24 is shown in an enlarged cut view. In FIG. 25, it becomes evident, that the width of tooth 102 decreases from the base of the tooth radially to the outside in a linear manner. Seal surface or sealing surface 103 faces the adjacent disk packet or the associated inner disk carrier in the installed state of pressure ring 36. The ends of fingers 105, 106 are curved radially towards the inside. The operating lever device contacts the curved ends of fingers 105, 106 in the installed state.

Figure 26:
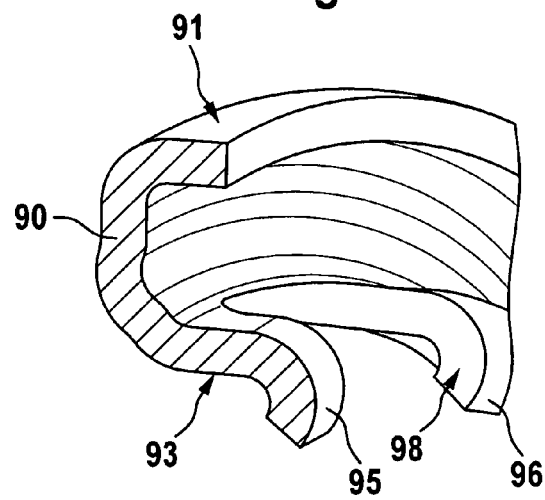
FIG. 26 illustrates the same cutout as in FIG. 25 according to another embodiment.
Figure 27:
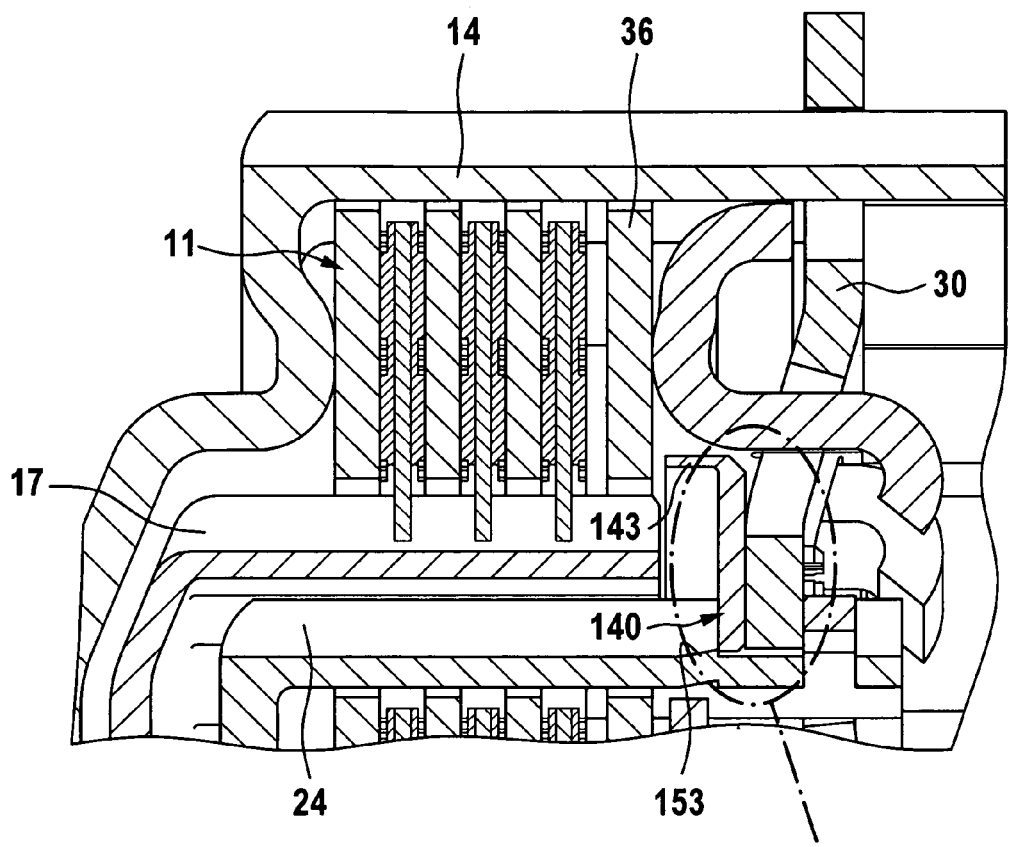
FIG. 27 is a similar illustration as in FIG. 2 according to another embodiment.

In FIG. 26, the same cutout as in FIG. 25 is illustrated according to another embodiment. The same embodiment is also shown in FIGS. 7 and 8. Bent over rim area 91 according to a first option serves for centering the pressure ring. According to another option, side surface 98 of finger 96 can be used for centering. Therefore, the side surface is designated as centering surface 98. The seal surface is designated as 93.

According to a major aspect of the embodiments shown in the FIGS. 25 and 26 as a cutout, pressure ring 36 for the spring design of the seal device is provided with an especially formed seal surface 93; 103. The special deformation allows in a simple manner, that the resiliently provided seal device is only clamped, when the clutch is closed. In the open state of the clutch, a gap is opened between the resiliently provided seal device and the pressure ring as shown in FIGS. 11 and 13. Thereby, lower tensions and forces occur during operation in the resiliently provided seal device and in the clutch components and actuation components. This provides that the associated clutches can be produced more economically.

In FIGS. 27 through 30, seal device 140 according to another embodiment is illustrated in the installed state and also separately in various views. Seal device 140 is provided as a plastic part according to another aspect of the invention. Thus, seal device 140 is preferably provided so that it can be produced through injection molding. Seal device 140 comprises seal ring or sealing ring 142, which is substantially shaped as a circular disk. Radially on the outside, seal ring 142 is integrally connected with collar 143, which is preferably angled at a right angle from seal ring 142. Collar 43 faces disk packet 11 of the radially outer multi-disk clutch and is disposed radially inside pressure ring 36. Simultaneously, collar 143 is disposed radially outside of inner disk carrier 17 of the outer radial disk clutch.

Figure 28:
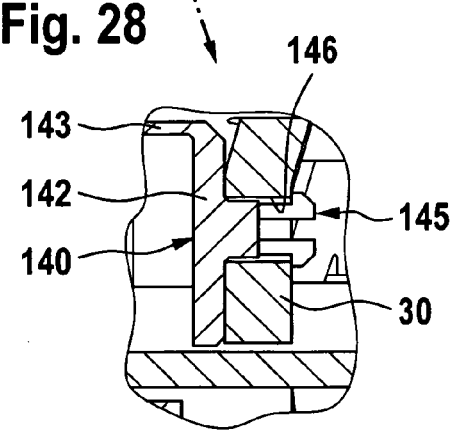
FIG. 28 is an enlarged cutout from FIG. 27.
Figure 29:
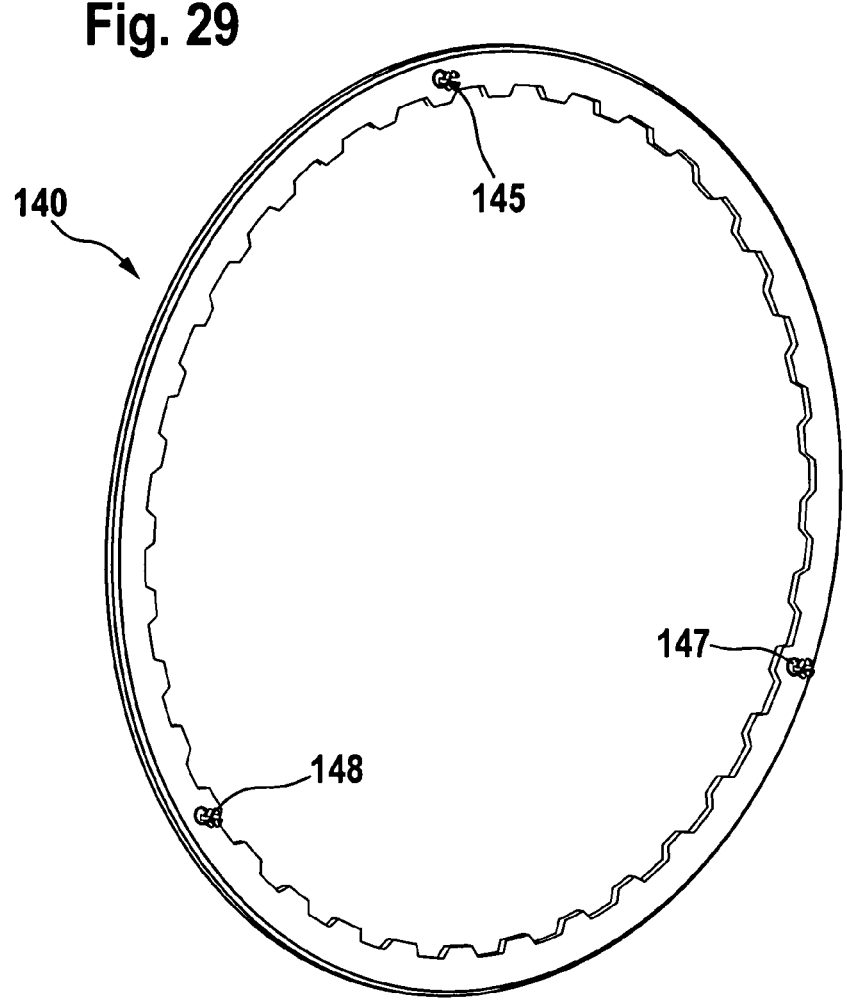
FIG. 29 is a perspective view of the seal device of FIGS. 27 and 28.
Figure 30:
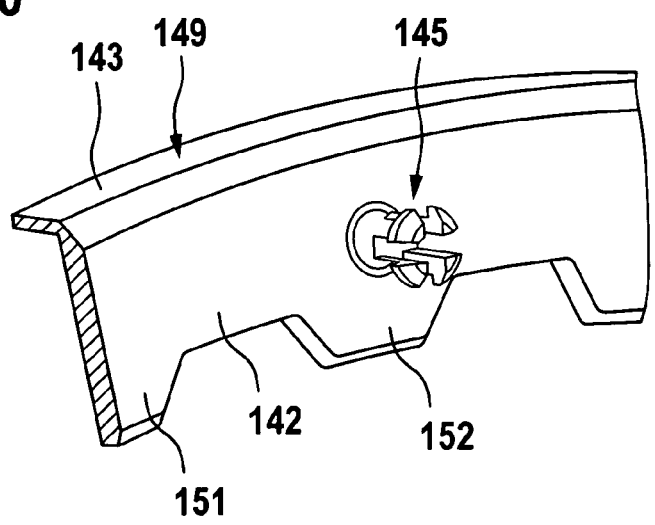
FIG. 30 is an enlarged cutout from FIG. 29.

Snap hooks 145 extend from seal ring 142 on its side, facing away from disk packet 11. Snap hooks 145 can be formed from several, in particular four, snap hook segments, as can be seen in FIG. 30. Snap hook 145 extends, as can be seen in FIG. 28, through pass-through opening 146, which is cut out in connection component 30. Pass-through opening 146 and snap hook 145 are sized and designed, so that snap hook 145 can be passed through pass-through opening 146 during assembly without getting damaged.

When seal ring 142 comes in contact with connection component 30, then the preloaded ends of snap hook 145 spread radially towards the outside, so that they reach through the rim area of pass-through hole 146 on the side facing away from seal ring 142, so that seal ring 142 is held in contact with connection component 30. It is evident in FIG. 29, that three snap hooks 145, 147, 148 are evenly distributed along the circumference of seal device 140. The seal surface of seal device 140 is designated as 149. Seal ring 142 has protrusions or teeth 151, 152 on the radial inside, which come in contact with protrusions 153 of outer disk carrier 24. Protrusions 153 form an axial stop for seal ring 142.

Figure 31:
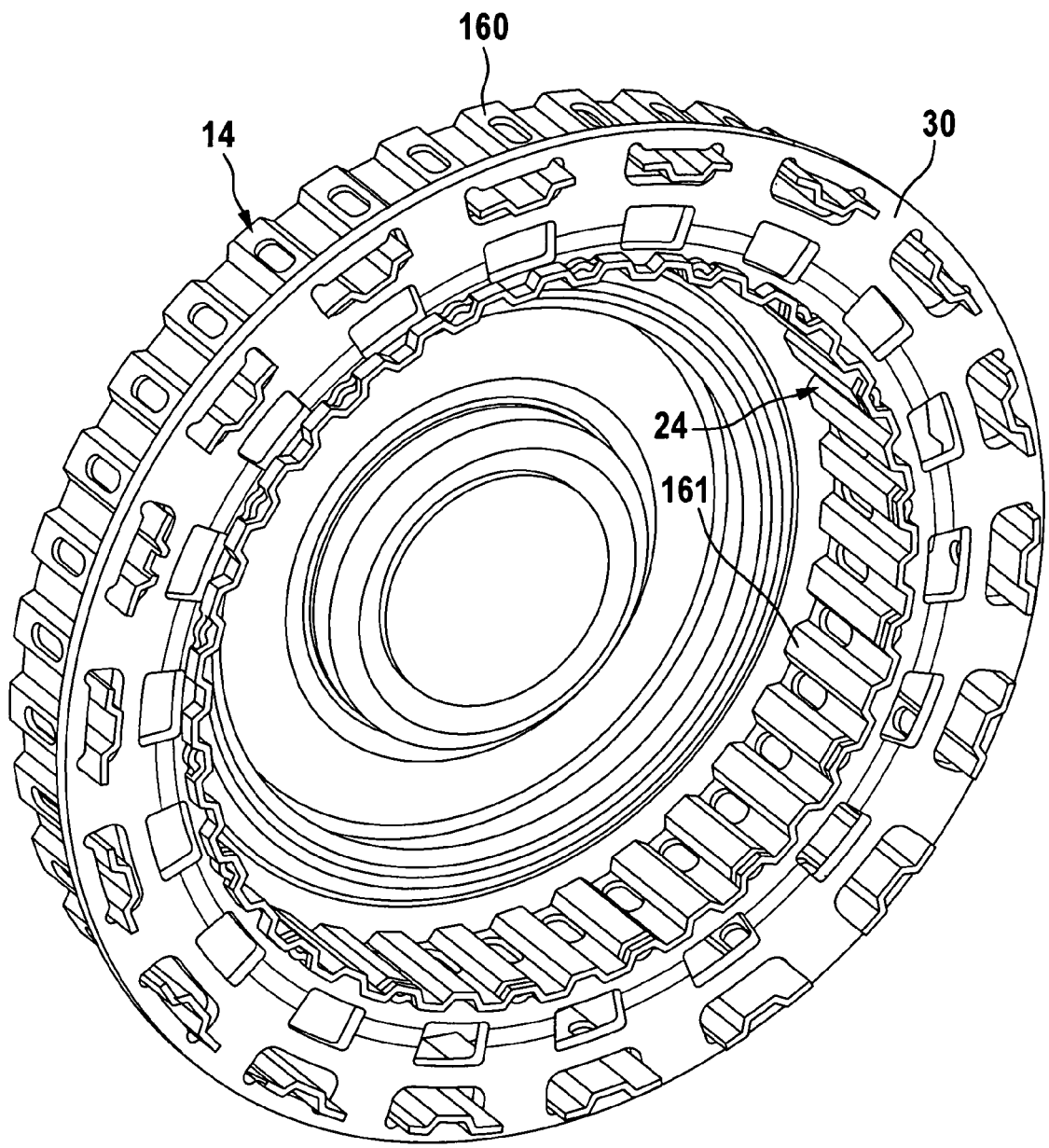
FIG. 31 is a perspective illustration of a torque transfer device according to the invention.
Figure 32:
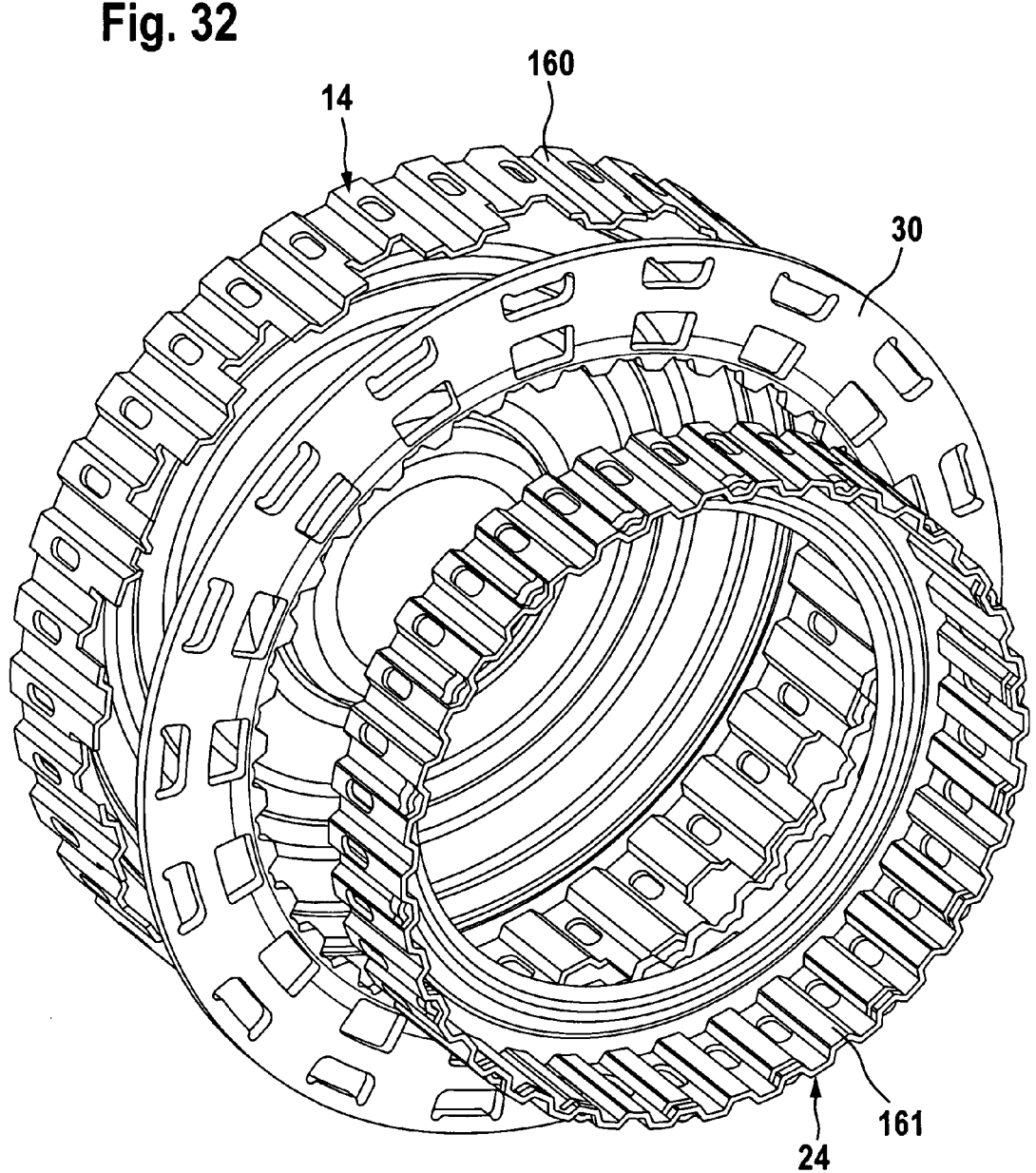
FIG. 32 is an exploded view of the torque transfer device from FIG. 31.
Figure 33:
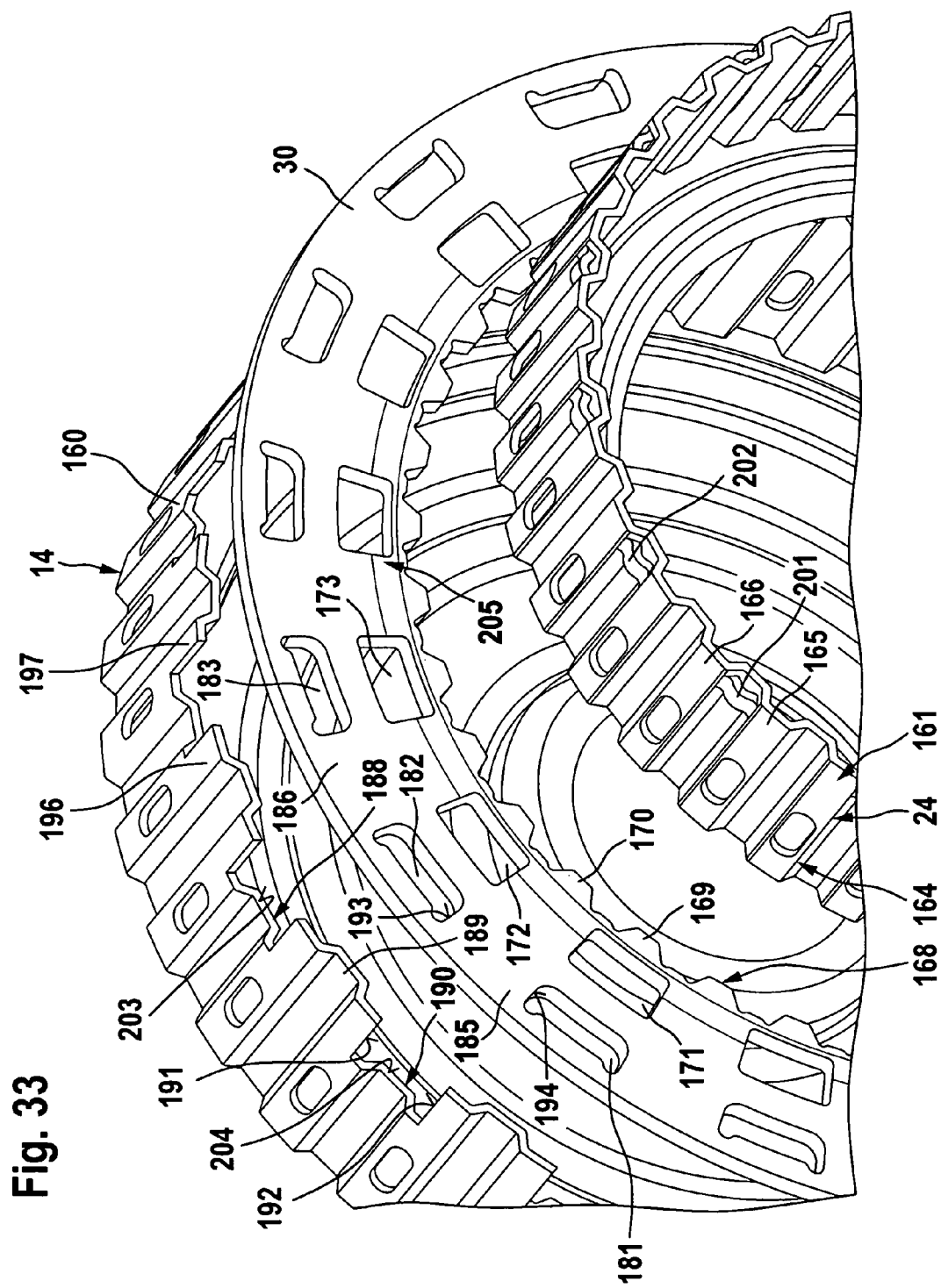
FIG. 33 is an enlarged cutout from FIG. 32.

In FIGS. 31 through 33, outer disk carrier 14 of the radially outer multi-disk clutch is shown together with connection component 30 and outer disk carrier 24 of the radially inner clutch in various views and illustrations. Outer disk carrier 14 comprises teething body 160, generated through roll forming. Teething body 160 is formed, so that it has an inner teething radially on the inside and an outer teething radially on the outside. Outer disk carrier 24 of the radially inner disk clutch comprises similar teething body 161, which, however, has a smaller diameter than teething body 160. In FIG. 33, the teething of outer teething carrier 24 is designated with 164. Teething 164 comprises an outer teething with teeth 165, 166, which are evenly distributed over the circumference of outer disk carrier 24. The outer teething of outer disk carrier 24 comes into engagement with inner teething 168, which is formed radially on the outside at connection component 30. Inner teething 168 comprises teeth 169, 170, engaging into the gaps between the teeth of the outer teething of outer disk carrier 24.

Connection component 30 comprises plurality of finger windows 171 through 173, which are evenly disposed over a circumference or partial circle of connection component 30. Finger windows 171 through 173 allow the fingers provided at the pressure ring to reach through. Radially outside of finger windows 171 through 173, bar windows 181 through 183 are cut out in connection component 30. Each bar window 181 through 183 is associated with finger window 171 through 173. Each bar window 181 through 183 is defined in circumferential direction by two respective bars 185, 186, extending in the radial direction of the connection component 30. The bar windows 181 through 183 serve for generating a non-rotatable form locked connection between connection component 30 and outer disk carrier 14.

For this purpose, outer disk carrier 14 has plurality of cutouts 188, 190, between which respective engagement element 189 is formed. Respective engagement element 189 is associated with each bar window 181 through 183. Cutout 190 is defined in circumferential direction by two opposing side surfaces 191, 192 of adjacent engagement elements 189. At side surfaces 191, 192 of cutout 190, side surfaces 193, 194 come in contact with connection component 30 in the inserted state, wherein the side surfaces define associated bar windows 181, 182 in connection component 30. In the assembled state, one respective engagement element 189 engages into the associated bar window 182. Cutouts 188, 190 are sized, so that part of associated tooth crests 196, 197 of teething 164 remains.

It is shown in FIGS. 31 through 33, how outer disk carrier 24 of inner clutch is engaged into outer disk carrier 14 of the outer clutch. Separate connection component 30 has the advantage, that teething bodies 160, 161 of the two outer disk carriers can be manufactured through roll forming respectively.

Connection component 30 has the function among others to conduct the torque from outer disk carrier 14, which is preferably connected non-rotatably with the crank shaft of a combustion engine, to teething body 161 of outer disk carrier 24 of the inner disk. The transfer of the torque from teething body 160 of outer disk carrier 14 is performed through side surfaces 191, 192 of cutouts 190 onto side surfaces 193, 194 of bars 185 of connection component 30. Connection component 30 is connected with outer disk carrier 14 through an insertable connection. The transfer of the torque from connection component 30 onto the teething body 161 is performed at the flanks of teeth 169, 170 of the inner teething of connection component 30 onto the flanks of teeth 165, 166 of the outer teething of teething body 161.

Furthermore, connection component 30 has the object and the function to support the actuation force of the radially interior disk clutch at outer disk carrier 14 of the outer disk clutch. Thereby, grooves 201, 202, protruded from teething body 161, serve as an axial stop of connection component 30 at teething body 161. Through formed out grooves 201, 202, the actuation force of the inner multi-disk clutch is transferred into connection component 30. Bars 185, 186 of connection component 30 contact with stop surfaces 203, 204 of cutouts 188, 190 in the axial direction in order to transfer the actuation force. For strength reasons it is advantageous, that protruded grooves 201, 202 are disposed symmetrically to the middle of bars 185, 186. Thereby, it is assured that the operating force is not transferred over small residual cross section 205 between inner teething 168 and finger windows 171, 172, 173 for the fingers of the pressure ring.

The teething of outer disk carrier 14 of the outer multi-disk clutch and the teethings at teething body 161 of outer disk carrier 24 of the inner multi-disk clutch have the same number of teeth. At teething body 161 of outer disk carrier 24 of the inner disk clutch, every second tooth is protruded, this means, provided with protruded groove 201, 202. The number of the bar windows and the number of the finger windows each correspond to half the number of the teeth.

For increasing the stiffness and in order to increase the allowable maximum speed, connection component 30 reaches around outer disk carrier 14 and supports outer tooth crests 196, 197 in a radial manner. In order to support all tooth crests, it is advantageous to provide connection component 30 with half the number of windows as there are teeth on outer disk carrier 14. The width of bar windows 181, 182, 183 is provided so that approximately two thirds of the tooth-crest width of the teeth of outer disk carrier 14 remain.

The radial fixation between teething body 161 of outer disk carrier 24, relative to connection component 30, is performed between the head circle diameter of teeth 165, 166 of teething body 161 and the base circle diameter of teeth 169, 170 of connection component 30. When teething body 161 is provided conically at the crest circle towards the open end, a clamping between these two parts can be performed when connection component 30 is inserted. Thereby, the radial clearance is reduced or eliminated.

Figure 34:
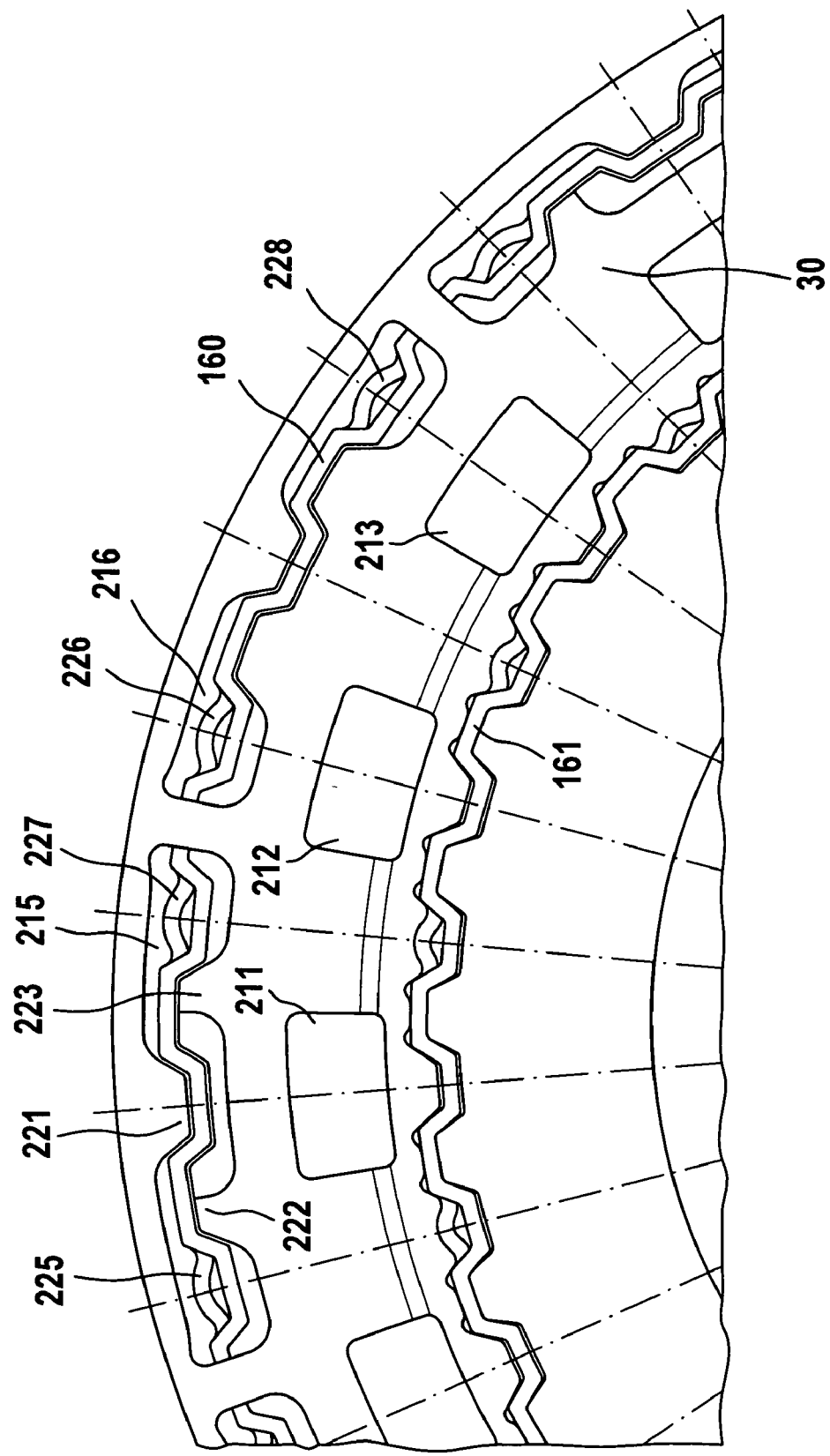
FIG. 34 is a similar cutout as in FIG. 33 in top view according to another embodiment.

In FIG. 34, another embodiment of connection component 30 with finger windows 211 through 213 and tooth windows 215, 216 is shown. Tooth windows 215, 216 each have one respective outer tooth 221, which extends radially inward at connection component 30 and two inner teeth 222, 223, which extend radially outward at connection component 30. Inner teeth 222, 223 engage into the inner teething of teething body 160. Outer tooth 221 engages into the outer teething of teething body 160. The torque transfer is performed through outer teeth 221, and also through inner teeth 222, 223. Inner teeth 222, 223 simultaneously support the centrifugal forces. The embodiment shown in FIG. 34 is characterized through a reduced surface pressure for the torque transfer between outer disk carrier 14 and connection component 30. In tooth windows 215, 216, two respective protruded grooves 225, 227 and 226, 228 are visible, which protrude from teething body 160.

DESIGNATIONS 1 twin clutch
3 radially outer multi-disk clutch
4 radially inner multi-disk clutch
11 disk packet
12 outer disks
13 outer disks
14 outer disk carrier
15 inner disks
16 inner disks
17 inner disk carrier
21 disk packet
22 outer disks
23 outer disks
24 outer disk carrier
25 inner disks
26 inner disks
27 inner disk carrier
30 carrier device
34 operating lever device
36 pressure transfer device
38 pass-through holes
40 finger
41 arrow
43 arrow
44 arrow
45 arrow
48 arrow
50 seal device
51 angled arm
54 lug
55 groove
56 arrow
57 arrow
58 double arrow
64 actuation lever device
66 pressure transfer
67 arrow
70 outer teething
72 arrow
80 seal device
81 end disk
82 seal location
84 lug
85 lug
86 lug
90 annular body
91 bent over ring area
93 seal surface
95 finger
96 finger
98 centering surface
100 annular body
101 rim area
102 tooth
103 seal surface 105 finger
106 finger
110 seal device
112 U-shaped positioning section
114 free end
116 circle
118 location
120 seal device
122 contact section
124 free end
126 bent over end
128 arrow
129 arrow
130 arrow
132 arrow
135 protruded groove
140 seal device
142 seal ring
143 collar
145 snap hook
146 pass-through opening
147 snap hook
148 snap hook
149 seal surface
151 lug
152 lug
153 protrusion
160 teething body
161 teething body
164 teething
165 tooth
166 tooth
171 finger window
172 finger window
173 finger window
181 bar window
182 bar window
183 bar window
185 bar
186 bar
188 cutout
189 engagement element
190 cutout
191 side surface
192 side surface
193 side surface
194 side surface
196 tooth crest
197 tooth crest
201 groove
202 groove
203 side surface
204 side surface
205 residual cross section
211 finger window
212 finger window
213 finger window
215 tooth window
216 tooth window
221 outer tooth
222 inner tooth
223 inner tooth
225 protruded groove
226 protruded groove
227 protruded groove
228 protruded groove

What is claimed is:

1. A torque transfer device for torque transfer between a drive unit and a transmission, with at least one multi-disk clutch (3, 4), comprising a first multi-disk clutch having at least one disk packet, comprising outer disks, connected non-rotatably with an outer disk carrier, and inner disks, connected non-rotatably with an inner disk carrier, and with at least one operating lever device for operating the first multi-disk clutch, wherein a pressure transfer device (36) extends between the disk packet (11) and the operating lever device (34) through at least one pass-through opening (38), which is cut out in a carrier device (30), wherein a seal device (50, 140) is operatively connected to a second outer disk carrier of a second multi-disk clutch, wherein said seal device is disposed between the inner disk carrier (17) and the pass-through opening (38).

2. The torque transfer device recited in claim 1, wherein the seal device (50, 140) comprises a seal ring (51, 142) overlapping an interface between the inner disk carrier (17) and the disk packet (11) in radial direction.

3. The torque transfer device recited in claim 2, wherein the seal ring (51) at least partially comprises a substantially L-shaped, U-shaped, or C-shaped cross section.

4. The torque transfer device recited in claim 2, wherein the seal ring (51), seen in cross section comprises an arm (52), which is disposed in radial direction between the pressure transfer device (36) and the second outer disk carrier (24) of the second multi-disk clutch (4), which is disposed radially within the first multi-disk clutch (3).

5. The torque transfer device recited in claim 2, wherein the seal ring (51) seen in cross section has an arm (52), which is disposed offset in axial direction relative to the inner disk carrier (17) and radially outside of the inner disk carrier (17).

6. The torque transfer device recited in claim 4, wherein the end of the arm (52) is disposed between the inner disk carrier (17) and an associated disk (81).

7. The torque transfer device recited in claim 2, wherein the seal ring (51), seen in cross section, comprises another arm, which is disposed offset in axial direction relative to the inner disk carrier, and radially within the inner disk carrier (17).

8. The torque transfer device recited in claim 1, wherein the seal device (50) comprises a transportation safety component that is operatively arranged to engage the second outer disk carrier of the second multi-disk clutch for maintaining an axial position of the outer disk carrier.

9. The torque transfer device recited in claim 1, wherein the seal device (50) comprises an installation safety mechanism, and the installation safety mechanism is a bayonet lock for causing an engagement of the seal device upon installation of the installation safety mechanism.

10. The torque transfer device recited in claim 1, wherein the seal device (50) comprises at least one lug (54), hook, arm, or combinations thereof, which at least partially extend radially towards the inside respectively, and engage into a depression, a pass-through opening, or a groove (55), which are respectively provided in the second outer disk carrier (24), which is disposed radially within the first multi-disk clutch (3).

11. The torque transfer device recited in claim 10, wherein the lug (54), hook, arm, or combinations thereof, is resiliently preloaded.

12. The torque transfer device recited in claim 2, wherein the seal ring (51) is resiliently preloaded.

13. The torque transfer device recited in claim 1, wherein the seal device (50) is provided, so that the opening motion of the first multi-disk clutch (3) is supported through the seal device.

14. The torque transfer device recited in claim 1, wherein the seal device (50) is provided, so that the seal device (50) performs its seal function, only when the first multi-disk clutch (3) is closed.

15. The torque transfer device recited in claim 1, wherein the seal device (50) is stamped or formed from sheet metal.

16. The torque transfer device recited in claim 1, wherein the seal device (140) is made from plastic.

17. The torque transfer device recited in claim 16, wherein the seal device (140) comprises at least one snap hook (145, 147, 148), engaging into an opening (146) of the carrier device (30).

18. The torque transfer device recited in claim 1, wherein the pressure ring (36) comprises a centering means.

19. The torque transfer device recited in claim 1, wherein the pressure ring (36) comprises lugs with side surfaces, in particular on the radial inside, which serve the purpose of centering the pressure ring.

20. The torque transfer device recited in claim 18, wherein the pressure ring (36) comprises teeth (102) with flanks, in particular on the radial outside, which serve the purpose of centering the pressure ring (36).

21. The torque transfer device recited in claim 18, wherein the pressure ring (36) comprises a bent over rim area (91) radially on the outside.

22. The torque transfer device recited in claim 1, wherein the first multi-disk clutch is an outer multi-disk clutch and the second multi-disk clutch is an inner multi-disk clutch, wherein the outer disk carrier (24) of the inner multi disk clutch (4) is assembled in two components from a teething body (161), which is connected torque proof through a teething with the outer disks of the inner multi-disk clutch, and a connection component (30), through which the outer disk carrier (24) of the inner multi-disk clutch (4) is connected torque proof with the outer disk carrier (14) of the outer multi disk clutch (3).

23. The torque transfer device recited in claim 22, wherein the teething body (161) is formed from a sheet metal part through roll forming.

24. The torque transfer device recited in claim 22, wherein the outer disk carrier (14) of the outer multi disk clutch (3) is connected with the connection part (30) through an insertion connection.

25. The torque transfer device recited in claim 24, wherein the outer disk carrier (14) of the outer multi disk clutch (3) has cutouts (188, 190), into which bars (185, 186) engage, which are provided at the connection component (30).

26. The torque transfer device recited in claim 25, wherein the width of the bars (185, 186) is selected, so that stamping the bars out from the radial outside to the radial inside, or vice versa is possible in the section of the tooth crests (196, 197) of the teething.

27. The torque transfer device recited in claim 22, wherein the teething body (161) is provided conical at its crest circle towards the open ends.

28. The torque transfer device recited in claim 25, wherein the bars (185, 186) extend in radial direction.

29. The torque transfer device recited in claim 28, wherein the bars (185, 186) extend in circumferential direction respectively between two bar windows (181-183), which are provided in the connection component (30).

30. The torque transfer device recited in claim 22, wherein the connection component (30) has finger windows (171-173), allowing fingers to reach through, extending from the pressure ring (36).

31. The torque transfer device recited in claim 30, wherein the connection component (30) has half as many finger windows (171-173), as teeth (169, 170).

32. The torque transfer device recited in claim 30, wherein the connection component (30) has as many finger windows (171-173), as bar windows (181-183).

33. The torque transfer device recited in claim 30, wherein the finger windows (171-173) are disposed radially within and overlapping in circumferential direction with the bar windows (181-183).

34. The torque transfer device recited in claim 30, wherein the finger windows (171-173) and/or the bar windows (181-183) are disposed evenly distributed in circumferential direction.

35. The torque transfer device recited in claim 22, wherein the connection component (30) reaches around the outer disk carrier (14) of the outer multi-disk clutch (3), and/or supports outwardly located tooth crests (196, 197) of the outer disk carrier (14) of the outer multi disk clutch (3) in the radial direction.

36. The torque transfer device recited in claim 22, wherein the connection component (30) has an inner teething (168), which is in engagement with an outer teething (164) of the teething body (161) of the outer disk carrier (24) of the inner multi disk clutch (4).

37. The torque transfer device recited in claim 26, wherein the teething body (161) has protruding grooves (201, 202), forming an axial stop for the connection component (30).

38. The torque transfer device recited in claim 37, wherein the protruding grooves (201, 202) are disposed symmetrical with reference to the middle of the bars (185, 186) of the connection component (30).

39. The torque transfer device recited in claim 37, wherein each second tooth of the teething body (161) of the outer disk carrier (24) of the inner multi-disk clutch (4) has a protruding groove (201, 202).

40. The torque transfer device recited in claim 22, wherein the outer disk carrier (14) of the outer multi disk clutch (3) has a teething with the same number of teeth, as the teething body (161) of the outer disk carrier (24) of the inner multi-disk clutch (4).

41. The torque transfer device recited in claim 22, wherein the outer disk carrier (14) of the outer multi-disk clutch (3) comprises a teething body (160), which is connected with the connection component (30) through an insertion teething.

42. The torque transfer device recited in claim 41, wherein tooth windows (215, 216) are provided in the connection component (30).

43. The torque transfer device recited in claim 42, wherein the tooth windows (215, 216) each have at least one radially inward extending outer tooth (221).

44. The torque transfer device recited in claim 42, wherein the tooth windows (215, 216) each comprise at least one radially outward extending inner tooth (222, 223).

45. The torque transfer device recited in claim 43, wherein the assembly of the inner teeth (222, 223) and/or of the outer teeth (221) is selected, having a sufficient cross section for undergoing a stamping operation in a punch die.

46. The torque transfer device recited in claim 44, wherein the outer disk carrier (14) of the outer multi-disk clutch (3) is supported in radial direction at the outer teeth (221), in particular at the flanks of the outer teeth (221) of the connection component (30).

47. The torque transfer device recited in claim 41, wherein the teething body (160) of the outer disk carrier (14) of the outer multi-disk clutch (3) has protruding grooves (225-228), forming an axial stop for the connection component (30).

48. The torque transfer device recited in claim 47, wherein the protruding grooves (225-228) are disposed symmetrical with reference to the middle of the tooth windows (215, 216) of the connection component (30).

49. The torque transfer device recited in claim 47, wherein every second tooth of the teething body (160) of the outer disk carrier (14) of the outer multi-disk clutch (3) has an outwardly formed groove (225-228).

50. The torque transfer device recited in claim 41, wherein the teething body (160) of the outer disk carrier (14) of the outer multi-disk clutch (3) comprises the same number of teeth as the teething body (161) of the outer disk carrier (24) of the inner multi-disk clutch (4).

51. The torque transfer device recited in claim 41, wherein the connection component (30) comprises finger windows (211-213), allowing fingers to reach through, extending from the pressure ring.

52. The torque transfer device recited in claim 51, wherein the connection component (30) has half as many finger windows (211-213) and/or tooth windows (215, 216) as it has teeth.

53. The torque transfer device according to claim 51, wherein the finger windows (211-213) are disposed radially within the tooth windows (215, 216).

54. The torque transfer device recited in claim 51, wherein the finger windows (211-213) and/or the tooth windows (215, 216) are disposed evenly distributed in circumferential direction.

55. The torque transfer device recited in claim 51, wherein the finger windows (211-213) and/or the tooth windows (215, 216) are disposed in the middle between the protruding grooves (225-228).

56. The torque transfer device recited in claim 51, wherein the finger windows (211-213) and/or the tooth windows (215, 216) extend in particular in circumferential direction over three teeth.

57. The torque transfer device recited in claim 41, wherein the number of teeth of the disk teething is divisible by 2 and by 3.

58. A drive train of a motor vehicle with a torque transfer device for torque transfer between a drive unit and a transmission, with at least one multi-disk clutch (3, 4), comprising an outer multi-disk clutch having at least one disk packet, comprising outer disks, connected non-rotatably with an outer disk carrier, and inner disks, connected non-rotatably with an inner disk carrier, and with at least one operating lever device for operating the multi-disk clutch, wherein a pressure transfer device (36) extends between the disk packet (11) and the operating lever device (34) through at least one pass-through opening (38), which is cut out in a carrier device (30), wherein a seal device (50, 140) is operatively connected to a second outer disk carrier of an inner multi-disk clutch, wherein said seal device is disposed between the inner disk carrier (17) and the pass-through opening (38).

59. The drive train for torque transfer between a drive unit, recited in claim 1, wherein the second outer disk carrier (24) of the inner multi disk clutch (4) is assembled in two components from a teething body (161), which is connected torque proof through a teething with the outer disks of the inner multi-disk clutch, and a connection component (30), through which the second outer disk carrier (24) of the inner multi-disk clutch (4) is connected torque proof with the outer disk carrier (14) of the outer multi disk clutch (3).

* * * * *